United States Patent
Shirota et al.

(10) Patent No.: US 8,837,427 B2
(45) Date of Patent: Sep. 16, 2014

(54) RESOURCE SELECTION FOR DUAL RADIO TERMINALS

(75) Inventors: Masakazu Shirota, Tokyo (JP); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 12/856,373

(22) Filed: Aug. 13, 2010

(65) Prior Publication Data

US 2011/0194427 A1    Aug. 11, 2011

Related U.S. Application Data

(60) Provisional application No. 61/234,241, filed on Aug. 14, 2009.

(51) Int. Cl.
*H04W 4/00* (2009.01)
*H04W 36/00* (2009.01)
*H04W 88/06* (2009.01)
*H04W 36/14* (2009.01)

(52) U.S. Cl.
CPC .......... *H04W 36/0022* (2013.01); *H04W 88/06* (2013.01); *H04W 36/14* (2013.01)
USPC ............ 370/331; 370/352; 370/353; 370/356

(58) Field of Classification Search
USPC ................... 370/331, 352, 353, 356
See application file for complete search history.

(56) References Cited

U.S. PATENT DOCUMENTS

| | | | | |
|---|---|---|---|---|
| 7,885,234 B2 * | 2/2011 | Ejzak | | 370/331 |
| 7,995,565 B2 * | 8/2011 | Buckley et al. | | 370/353 |
| 8,189,523 B2 * | 5/2012 | Barbaresi et al. | | 370/329 |
| 8,243,725 B2 * | 8/2012 | Aghili et al. | | 370/354 |
| 8,270,372 B2 * | 9/2012 | Wu | | 370/331 |
| 2007/0026861 A1 * | 2/2007 | Kuhn et al. | | 455/436 |
| 2008/0013619 A1 * | 1/2008 | Meylan et al. | | 375/240 |
| 2008/0023752 A1 * | 1/2008 | Chen et al. | | 257/327 |
| 2008/0305825 A1 * | 12/2008 | Shaheen | | 455/552.1 |

(Continued)

FOREIGN PATENT DOCUMENTS

WO    WO2008081267 A1    7/2008

OTHER PUBLICATIONS

Anonymous: 3GPP2-Drafts, 2500 Wilson Boulevard, Suite 300, Arlington, Virginia 22201, USA Ord-0000-00-00, Jun. 30, 2009, XP040474309.

(Continued)

*Primary Examiner* — Ricky Ngo
*Assistant Examiner* — Dewanda Samuel

(57) ABSTRACT

Systems, methods and apparatus described herein include features that enable dual radio access. In one embodiment, the access point directs an access terminal through sequential measurements, which are selected by the access point based on the radio access capability of the access terminal, service preferences of the user and measurement reports. In a complementary method, an access terminal obtains the sequential measurements chosen by the access point. In another embodiment, the access point directs an access terminal through a set of measurements, which are selected by the access point based on the radio access capability of the access terminal and service preferences of the user. In another embodiment, an access terminal selects which subset of measurements to obtain based on the radio access capability of the access terminal and optionally service preferences of the user.

50 Claims, 19 Drawing Sheets

(56) References Cited

U.S. PATENT DOCUMENTS

| | | | |
|---|---|---|---|
| 2009/0036131 A1* | 2/2009 | Diachina et al. | 455/436 |
| 2009/0290556 A1* | 11/2009 | Taaghol | 370/331 |
| 2010/0002651 A1* | 1/2010 | Hofmann | 370/331 |
| 2010/0075651 A1 | 3/2010 | Hallenstaal et al. | |
| 2010/0098023 A1* | 4/2010 | Aghili et al. | 370/331 |

OTHER PUBLICATIONS

International Search Report and Written Opinion—PCT/US2010/045649, International Search Authority—European Patent Office—Dec. 3, 2010.

Nokia Siemens Networks et al: "Enhanced CS fallback to 1xRTT with PS Handover", 3GPP Draft; S2-094550 Enhanced 1XCSFB-Draft-V05A, 3rd Generation Partnership Project (3GPP), Mobile Competence Centre ; 650, Route Des Lucioles : F-06921 Sophia-Antipolis Cedex : France, No. Sophia. 20090630, Jun. 30, 2009, XP050356039, [retrieved on Jun. 30, 2009] p. 16, chapter "B.2.3a.6 Interaction between enhanced CS Fallback to 1xRTT and optimized PS handover".

Nokia Siemens Networks et al: "IxRTT CSFB with PS handover" 3GPP Draft; S2-093532_1XCSFB With PS HO -CR-Final, 3rd Generation Partnership Project (3GPP), Mobile Competence Centre ; 650, Route Des Lucioles ; F-06921 Sophia-Antipolis Cedex ; France, No. Tallinn ; 20090505, May 5, 2009, XP050346597 the whole document.

Nokia Siemens Networks, KDDI, China Telecom, Nortel, Huawei, Motorola, Qualcomm Europe, Samsung, LG Electronics, NEC,Enhanced 1xRTT CS fallback proposal,S2-094549,3GPP, Jul. 10, 2009.

Nortel Networks, Alcatel-Lucent, Cisco, Ericsson, Motorola, Verizon Wireless,3GPP2 1xRTT Measurement reports and control,R2-073492,3GPP, Aug. 24, 2007.

* cited by examiner

US 8,837,427 B2

RESOURCE SELECTION FOR DUAL RADIO TERMINALS

CLAIM OF PRIORITY UNDER 35 U.S.C. §119

The present application for patent claims priority to U.S. Provisional Patent Application No. 61/234,241, entitled "METHOD AND APPARATUS FOR RESOURCE SELECTION BASED ON INTER radio access technology MEASUREMENT FOR DUAL RADIO SUPPORTED TERMINALS," filed Aug. 14, 2009. The above-referenced provisional patent application is hereby expressly incorporated by reference herein.

BACKGROUND

1. Field

The present application relates to wireless communication, and more specifically to systems, methods and devices to enable management of wireless network resources.

2. Background

Wireless networks employing packet-switched (PS) technology are deployed to provide various types of data communication services. Demand for high-rate wireless data services is driving the migration towards PS technology. Some PS networks are based on the long-term evolution (LTE) standards or similar technology, which were developed to be the next generation of wireless networks for voice and data services. But the deployment of PS networks and system resources has occurred piecemeal, often within previously available circuit-switched (CS) networks. As a result, some wireless networks contain both PS and CS system resources.

Some users prefer the quality of service (QoS) for voice service on CS system resources over the QoS for voice service on PS system resources. As a result, some wireless network carriers support a scheme known as CS fallback. CS fallback allows mobile devices to request access to CS system resources for voice service while camped on PS networks.

Some mobile devices include dual radio transceivers, which allow a mobile device to receive CS voice service and PS data service simultaneously. As a result, PS data service does not have to be terminated or suspended while a mobile device utilizes CS voice service. However, the combination of LTE PS data service and CS voice service is not always supported. Accordingly, there lies a challenge to provide a non-LTE data service in combination with CS voice service, when a mobile device is camped on an LTE network.

SUMMARY OF THE INVENTION

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to enable resource selection for dual radio transceivers, and in some embodiments provide a non-LTE data service in combination with CS voice service, when a mobile device is camped on an LTE network.

One aspect of the disclosure is a method including receiving a request for a second radio access technology on a second frequency band, wherein accessing the second radio access technology causes a change in the capability of an access terminal to receive the first radio access technology; receiving a first measurement report from the access terminal; selecting, utilizing the first measurement report, a third radio access technology on a third frequency band to replace the first radio access technology; and initiating a concurrent handover from the first radio access technology to the second and third radio access technology.

One aspect of the disclosure is a method including communicating with a first radio access technology on a first frequency band from an access point; transmitting a request for a second radio access technology provided on a second frequency band, wherein participating in the reception of the second radio access technology is not compatible with the capability of the access terminal to receive the first radio access technology; obtaining at least one measurement; transmitting a first measurement report to the access point, wherein the first measurement report comprises at least one measurement; and receiving a handoff initiation message from the access point.

One aspect of the disclosure is a wireless access point including means for receiving, wherein said receiving means are configured to receive a request for a second radio access technology on a second frequency band, wherein accessing the second radio access technology causes a change in the capability of an access terminal to receive the first radio access technology, and receive a first measurement report from the access terminal; means for selecting, utilizing the first measurement report, a third radio access technology on a third frequency band to replace the first radio access technology; and means for initiating a concurrent handover from the first radio access technology to the second and third radio access technology.

One aspect of the disclosure is a wireless access terminal including means for communicating with a first radio access technology on a first frequency band from an access point; means for transmitting a request for a second radio access technology provided on a second frequency band, wherein participating in the reception of the second radio access technology is not compatible with the capability of the access terminal to receive the first radio access technology; means for measuring, wherein the measuring means are configured to obtain at least one measurement; wherein the transmitting means is also configured to transmit a first measurement report to the access point, wherein the first measurement report comprises at least one measurement; and means for receiving a handoff initiation message from the access point.

One aspect of the disclosure is a wireless access point including a controller configured to execute code; and non-transitory computer readable memory storing code that when executed by the controller is configured to: receive a request for a second radio access technology on a second frequency band, wherein accessing the second radio access technology causes a change in the capability of an access terminal to receive the first radio access technology; receive a first measurement report from the access terminal; select, utilizing the first measurement report, a third radio access technology on a third frequency band to replace the first radio access technology; and initiate a concurrent handover from the first radio access technology to the second and third radio access technology.

One aspect of the disclosure is a wireless access terminal including a controller configured to execute code; and non-transitory computer readable memory storing code that when executed by the controller is configured to: communicate with a first radio access technology on a first frequency band from an access point; transmit a request for a second radio access technology provided on a second frequency band, wherein participating in the reception of the second radio access technology is not compatible with the capability of the access terminal to receive the first radio access technology; obtain at least one measurement; transmit a first measurement report to the access point, wherein the first measurement report comprises at least one measurement; and receive a handoff initiation message from the access point.

One aspect of the disclosure is a system including a controller configured to execute code; and non-transitory computer readable memory storing code that when executed by the controller is configured to: receive a request for a second radio access technology on a second frequency band, wherein accessing the second radio access technology causes a change in the capability of an access terminal to receive the first radio access technology; receive a first measurement report from the access terminal; select, utilizing the first measurement report, a third radio access technology on a third frequency band to replace the first radio access technology; and initiate a concurrent handover from the first radio access technology to the second and third radio access technology.

One aspect of the disclosure is a system including a controller configured to execute code; and non-transitory computer readable memory storing code that when executed by the controller is configured to: communicate with a first radio access technology on a first frequency band from an access point; transmit a request for a second radio access technology provided on a second frequency band, wherein participating in the reception of the second radio access technology is not compatible with the capability of the access terminal to receive the first radio access technology; obtain at least one measurement; transmit a first measurement report to the access point, wherein the first measurement report comprises at least one measurement; and receive a handoff initiation message from the access point.

Figure 1:
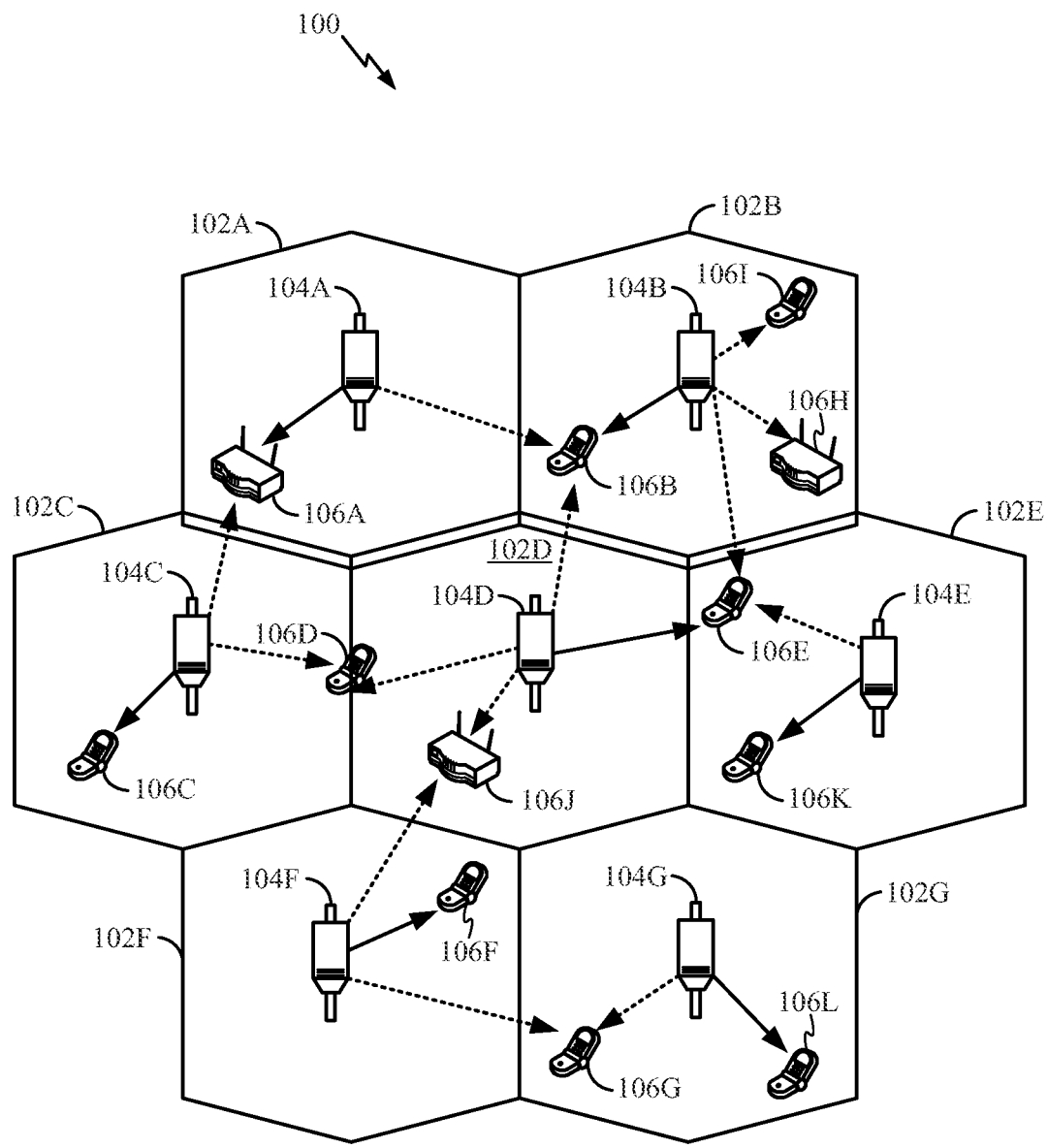
FIG. 1 is a simplified diagram of a wireless system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2). These various radio technologies and standards are known in the art.

FIG. 1 is a simplified diagram of a wireless communication system 100, configured to support a number of users, in which the teachings herein may be implemented. The system 100 provides communication for multiple cells 102, such as, for example, macro cells 102A-102G, with each cell being serviced by a corresponding access point 104 (e.g., access points 104A-104G). Access terminals 106 (e.g., access terminals 106A-106L) may be dispersed at various locations throughout the system over time. Each access terminal 106 may communicate with one or more access points 104 on a forward link (FL) and/or a reverse link (RL) at a given moment, depending upon whether the access terminal 106 is active and whether it is in soft handoff, for example. The wireless communication system 100 may provide service over a large geographic region. For example, macro cells 102A-102G may cover a few blocks in a densely populated urban neighborhood or several miles in rural environment.

Figure 2A:
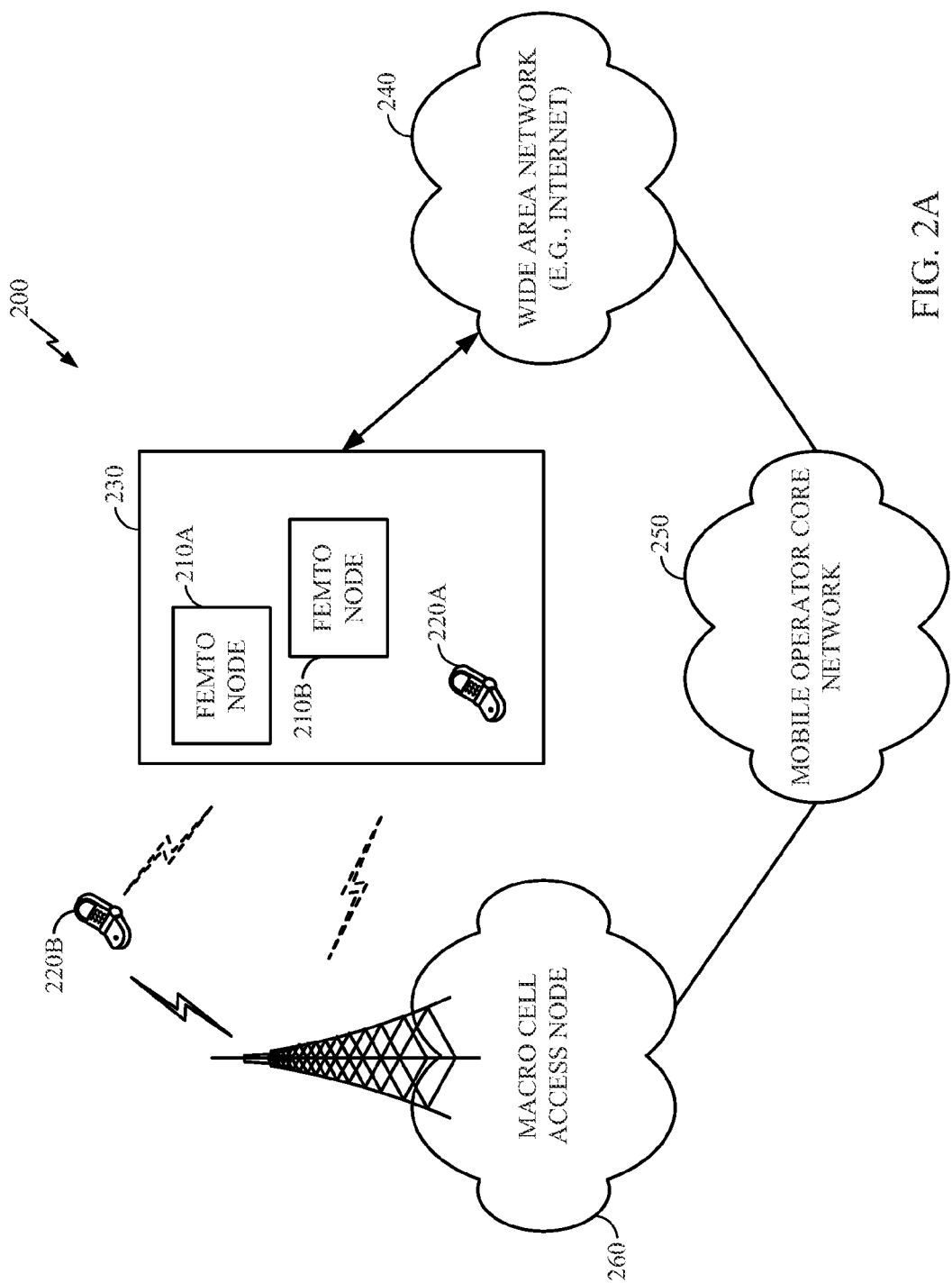
FIG. 2A is a simplified diagram of a wireless system including femto nodes.

FIG. 2A is a simplified diagram of an example communication system 200 where one or more femto nodes are deployed within a network environment. Specifically, the system 200 includes multiple femto nodes 210 (e.g., femto nodes 210A and 210B) installed in a relatively small scale network environment (e.g., in one or more user residences 230). Each femto node 210 may be coupled to a wide area network 240 (e.g., the Internet) and a mobile operator core network 250 via a DSL router, a cable modem, a wireless link, or other connectivity means (not shown). As will be discussed below, each femto node 210 may be configured to serve associated access terminals 220 (e.g., access terminal 220A) and, optionally, alien access terminals 220 (e.g., access terminal 220B). In other words, access to femto nodes 210 may be restricted whereby a given access terminal 220 may be served by a set of designated (e.g., home) femto node(s) 210 but may not be served by any non-designated femto nodes 210 (e.g., a neighbor's femto node 210).

The owner of a femto node 210 may subscribe to mobile service, such as, for example, 3G mobile service, offered through the mobile operator core network 250. In addition, an access terminal 220 may be capable of operating both in macro environments and in smaller scale (e.g., residential) network environments. In other words, depending on the current location of the access terminal 220, the access terminal 220 may be served by a macro cell access point 260 associated with the mobile operator core network 250 or by any one of a set of femto nodes 210 (e.g., the femto nodes 210A and 210B that reside within a corresponding user residence 230). For example, when a subscriber is outside his home, he is served by a standard macro access point (e.g., access point 260) and when the subscriber is at home, he is served by a femto node (e.g., node 210A). Here, it should be appreciated that a femto node 210 may be backward compatible with existing access terminals 1020.

A femto node 210 may be deployed on a single frequency or, in the alternative, on multiple frequencies. Depending on the particular configuration, the single frequency or one or more of the multiple frequencies may overlap with one or more frequencies used by a macro access point (e.g., access point 260).

An access terminal 220 may be configured to connect to a preferred femto node (e.g., the home femto node of the access terminal 220) whenever such connectivity is possible. For example, whenever the access terminal 220 is within the user's residence 230, it may be preferred that the access terminal 220 communicate with the home femto node 210.

Figure 2B:
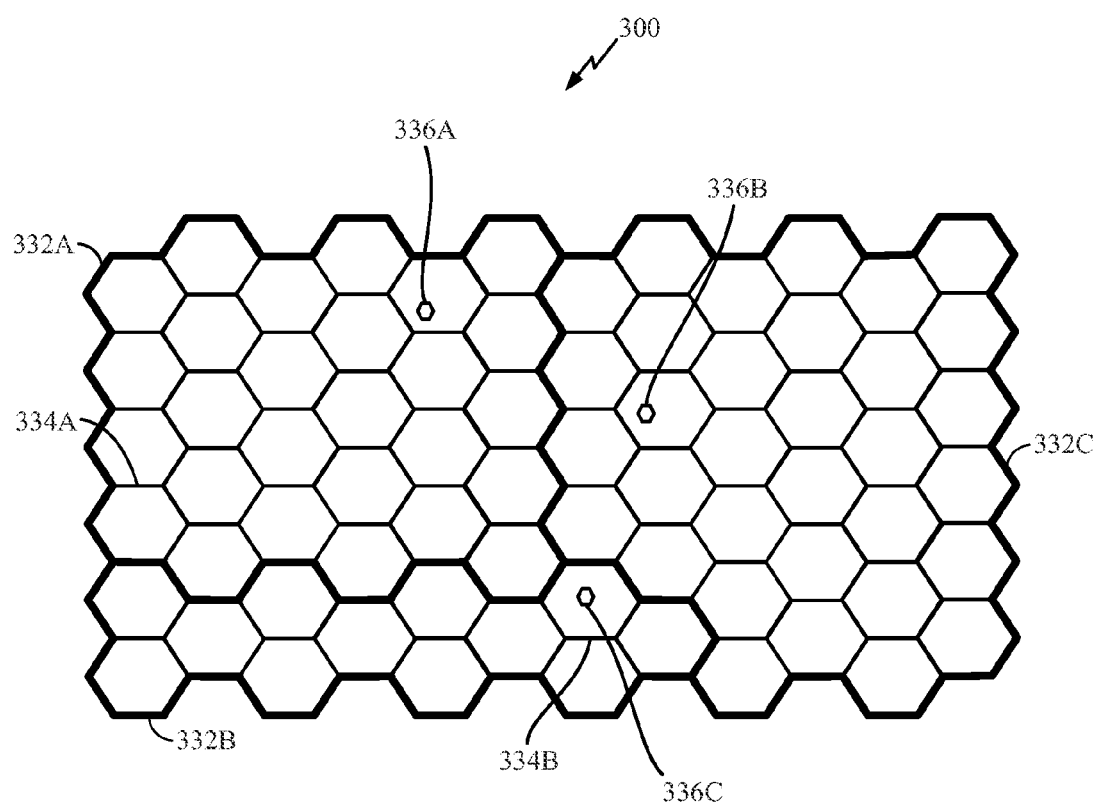
FIG. 2B is a simplified diagram illustrating coverage areas in a wireless system including macro cells and femto cells.

FIG. 2B is a simplified diagram illustrating an example of a coverage map 300 where several tracking areas 332 (or routing areas or location areas) are defined, each of which includes several macro coverage areas 334. Here, areas of coverage associated with tracking areas 332A, 332B, and 332C are delineated by the wide lines and the macro coverage areas 304 are represented by the hexagons. The tracking areas 332 also include femto coverage areas 336. In this example, each of the femto coverage areas 336 (e.g., femto coverage area 336C) is depicted within a macro coverage area 334 (e.g., macro coverage area 334B). It should be appreciated, however, that a femto coverage area 336 may not lie entirely within a macro coverage area 304. In practice, a large number of femto coverage areas 336 may be defined with a given tracking area 332 or macro coverage area 334. Also, one or more pico coverage areas (not shown) may be defined within a given tracking area 332 or macro coverage area 334.

Figure 3:
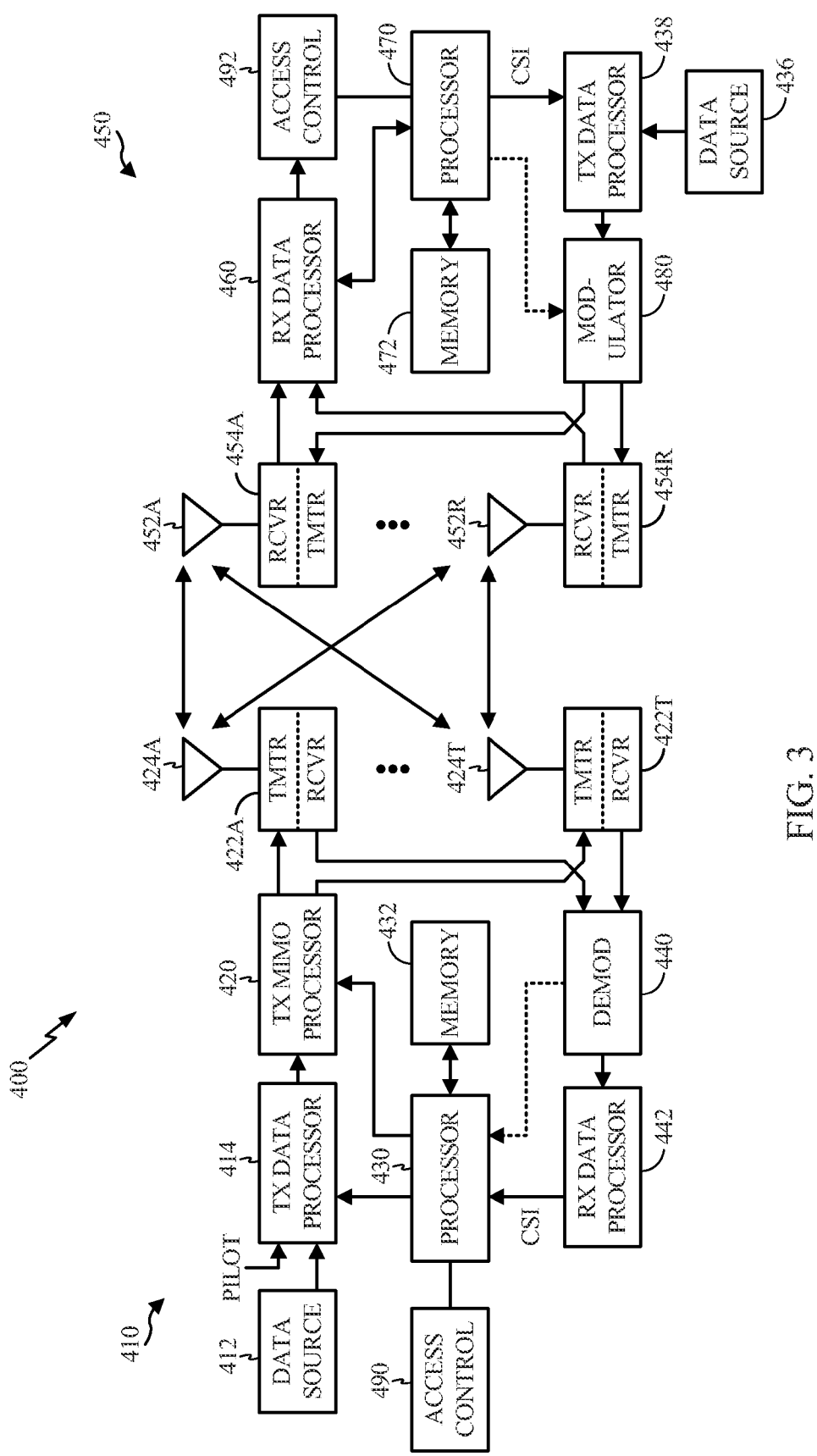
FIG. 3 is a simplified block diagram of several sample aspects of communication components.

The teachings herein may be incorporated into a node (e.g., a device) employing various components for communicating with at least one other node. FIG. 3 depicts several sample components that may be employed to facilitate communication between nodes. Specifically, FIG. 3 is a simplified block diagram of a first wireless device 410 (e.g., an access point) and a second wireless device 450 (e.g., an access terminal) of a MIMO system 400. At the first device 410, traffic data for a number of data streams is provided from a data source 412 to a transmit (TX) data processor 414.

In some aspects, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the device 410.

The modulation symbols for all data streams are then provided to a TX MIMO processor 420, which may further process the modulation symbols (e.g., for OFDM). The TX MIMO processor 420 then provides $N_T$ modulation symbol streams to $N_T$ transceivers (XCVR) 422A through 422T. In some aspects, the TX MIMO processor 420 applies beamforming weights to the symbols of the data streams and to the antenna from which the symbol is being transmitted.

Each transceiver 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 422A through 422T are then transmitted from $N_T$ antennas 424A through 424T, respectively.

At the second device 450, the transmitted modulated signals are received by $N_R$ antennas 452A through 452R and the received signal from each antenna 452 is provided to a respective transceiver (XCVR) 454A through 454R. Each transceiver 454 conditions (e.g., filters, amplifies, and downconverts) a respective received signal, digitizes the conditioned signal to provide samples, and further processes the samples to provide a corresponding "received" symbol stream.

A receive (RX) data processor 460 then receives and processes the $N_R$ received symbol streams from $N_R$ transceivers 454 based on a particular receiver processing technique to provide $N_T$ "detected" symbol streams. The RX data processor 460 then demodulates, deinterleaves, and decodes each detected symbol stream to recover the traffic data for the data stream. The processing by the RX data processor 460 is complementary to that performed by the TX MIMO processor 420 and the TX data processor 414 at the device 410.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the second device 450.

The reverse link message may comprise various types of information regarding the communication link and/or the received data stream. The reverse link message is then processed by a TX data processor 438, which also receives traffic data for a number of data streams from a data source 436, modulated by a modulator 480, conditioned by the transceivers 454A through 454R, and transmitted back to the device 410.

At the device 410, the modulated signals from the second device 450 are received by the antennas 424, conditioned by the transceivers 422, demodulated by a demodulator (DEMOD) 440, and processed by an RX data processor 442 to extract the reverse link message transmitted by the second device 450. The processor 430 then determines which precoding matrix to use for determining the beam-forming weights, and then processes the extracted message.

FIG. 3 also illustrates that the communication components may include one or more components that perform access control operations as taught herein. For example, an access control component 490 may cooperate with the processor 430 and/or other components of the device 410 to send/receive signals to/from another device (e.g., device 450) as taught herein. Similarly, an access control component 492 may cooperate with the processor 470 and/or other components of the device 450 to send/receive signals to/from another device (e.g., device 410). It should be appreciated that for each device 410 and 450 the functionality of two or more of the described components may be provided by a single component. For example, a single processing component may provide the functionality of the access control component 490 and the processor 430 and a single processing component may provide the functionality of the access control component 492 and the processor 470.

Figure 4:
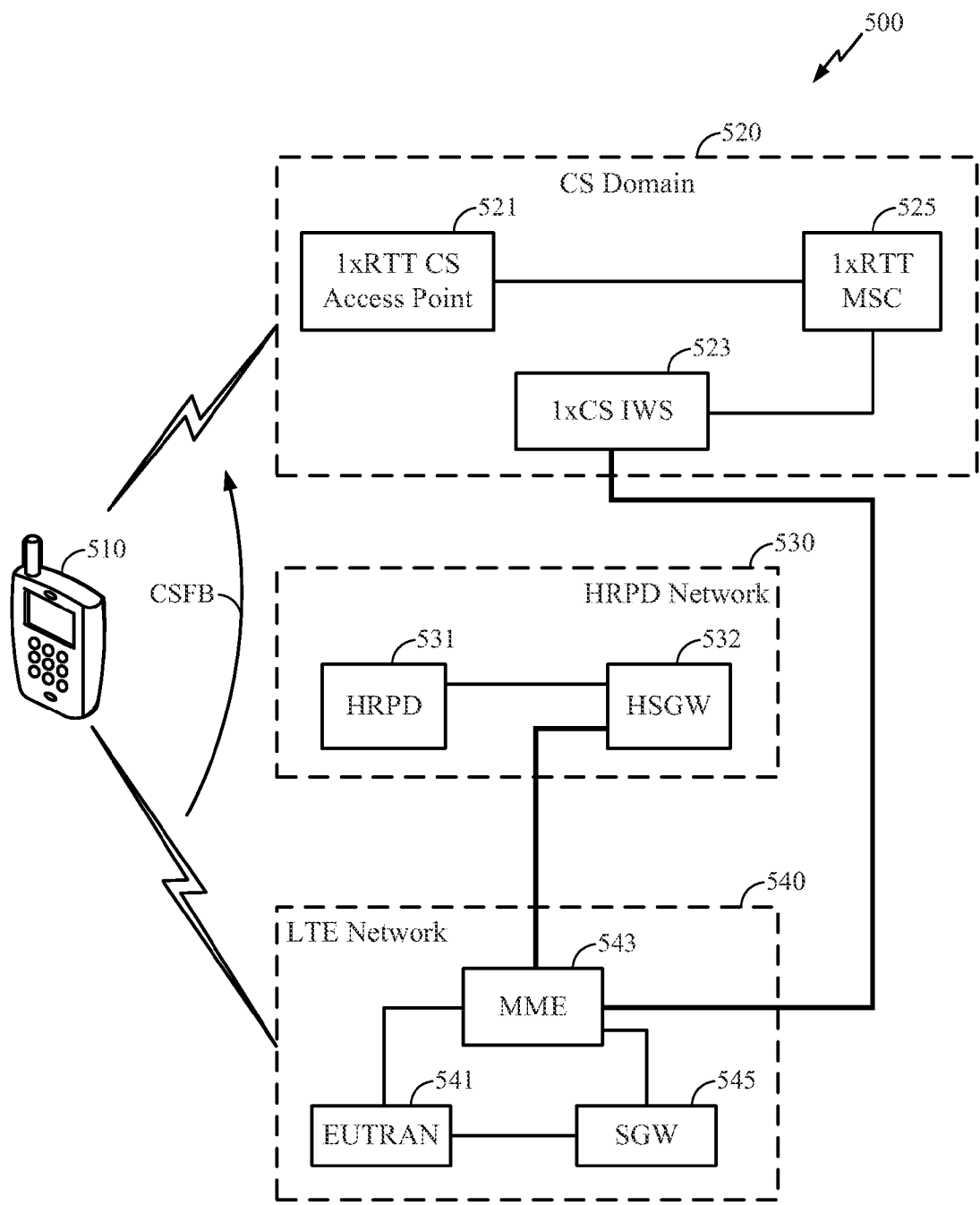
FIG. 4 is a simplified block diagram of several sample aspects of a wireless system.

FIG. 4 is a simplified block diagram of several sample aspects of a communication system 500. The system 500 includes a circuit-switched (CS) domain (or network) 520, a high rate packet data (HRPD) network 530, and an LTE packet-switched (PS) network 540. The system 500 also includes a mobile device or user equipment (UE) 510. While only one UE 510 has been illustrated in FIG. 4, those skilled in the art will appreciate that an LTE system may include any number of access terminals, mobile devices, UEs and the like.

Those skilled in the art will also appreciate that a CS domain of a wireless network may have more components than the simplified CS domain 520 illustrated in FIG. 4. The CS domain 520 illustrated in FIG. 4 includes only those components useful for describing some prominent features of embodiments within the scope of the claims. The CS domain 520 includes a 1xRTT CS access node 521 (herein after referred to as "base station 521"), an interworking solution node (IWS) 523, and a mobile switching center (MSC) 525.

Those skilled in the art will also appreciate that an LTE PS network may have more components than the simplified LTE PS network 540 illustrated in FIG. 4. The LTE PS domain 540 illustrated in FIG. 4 only contains those components useful for describing some prominent features of embodiments within the scope of the claims. The LTE PS domain 540 includes an evolved UMTS terrestrial radio access network (EUTRAN) node 541 configured according to LTE or a similar technology. The LTE PS domain 540 also includes a mobility management entity (MME) 543 and a packet data network serving gateway (SGW) 545.

Those skilled in the art will also appreciate that an HRPD network may have more components than the simplified HRPD network 530 illustrated in FIG. 4. The HRPD 530 illustrated in FIG. 4 only contains those components useful for describing some prominent features of embodiments within the scope of the claims. The HRPD network 530 includes an HRPD access node (AN) 531 configured to provide an intra-frequency HRPD data service along with the CS voice service provided by the base station 521. The HRPD network 530 includes an HRPD serving gateway (HSGW) 532. The HSWG 532 is in communication with the MME 543. The communication link between the HSWG 532 and MME 543 is used to exchange HRPD handover/channel assignment messages.

If the UE 510 include dual radio access capability it may be possible for the UE 510 to receive both CS voice service and PS data service simultaneously. There are at least two dual radio access schemes. The first is known as inter-frequency dual radio access and the second is known as intra-frequency dual radio access. According to an inter-frequency dual radio access scheme an access terminal is capable of establishing and maintaining two wireless communication links, which are each on a separate frequency band from the other. For example, the combination of LTE PS data service and CS voice service would typically be an inter-frequency dual radio access scheme because LTE PS data service and CS voice service are typically provided on separate frequency bands. On the other hand, according to an intra-frequency dual radio access scheme an access terminal is capable of establishing and maintaining two wireless communication links so long as the two wireless communication links are on the same frequency band. For example, the combination of HRPD PS data service and CS voice service would typically be an intra-frequency dual radio access scheme because HRPD PS data service and CS voice service are typically provided on the same frequency band.

In operation the MME 543 and the IWS 523 bridge the PS and CS domains 540, 520. For LTE service, the UE 510 accesses the PS domain 540 through the EUTRAN 541. For CS voice service the UE 510 accesses the CS domain 520 through the base station 521. If the UE 510 is initially "camped" or connected to the PS domain 540 when CS voice service is requested, the UE 510 undergoes a transfer of service from the EUTRAN 541 to the base station 521 (i.e. from the PS domain 540 to the CS domain 520).

However, some dual radio access transceivers, and even some network operators, do not support inter-frequency dual radio access, and thus cannot support the combination of LTE PS data service and CS voice service on separate frequency bands. Accordingly, in such a scenario, if the UE 510 is to concurrently maintain a link for CS voice service and another link for PS data service, the PS data service will have to be transferred to the HRPD network 530 when the CS fallback occurs. In other words, the LTE network 540, and specifically the EUTRAN 541, requires a procedure to concurrently handover service to at least two other radio access technologies. In the system 500 shown in FIG. 4, the two radio access technologies are 1xRTT and HRPD. However, those skilled in the art will appreciate that any two suitable radio access technologies may be used in combination without departing from the scope of the appended claims. Moreover, it is preferable to for the procedure to select the radio access technologies by utilizing and considering factors such as, for example, the types of services preferred by one or more users, the quality of service preferred by one or more users, how one or more users rank preferences, local policy, network wide policy, or other factors that are useful for selecting radio access technologies in order to support dual radio access.

Systems, methods and apparatus described herein include features that enable dual radio access. In one embodiment, the access point directs an access terminal through sequential measurements, which are selected by the access point based on the radio access capability of the access terminal, service preferences of the user and measurement reports. In a complementary method, an access terminal obtains the sequential measurements chosen by the access point. In another embodiment, the access point directs an access terminal through a set of measurements, which are selected by the access point based on the radio access capability of the access terminal and service preferences of the user. In a complementary method an access terminal obtains the measurements chosen by the access point. In another embodiment, the access point receives valid measurements for a subset of the measurement objects selected by the access point. In a complementary method, an access terminal selects which subset of measurements to obtain based on the radio access capability of the access terminal and optionally service preferences of the user.

Figure 5:
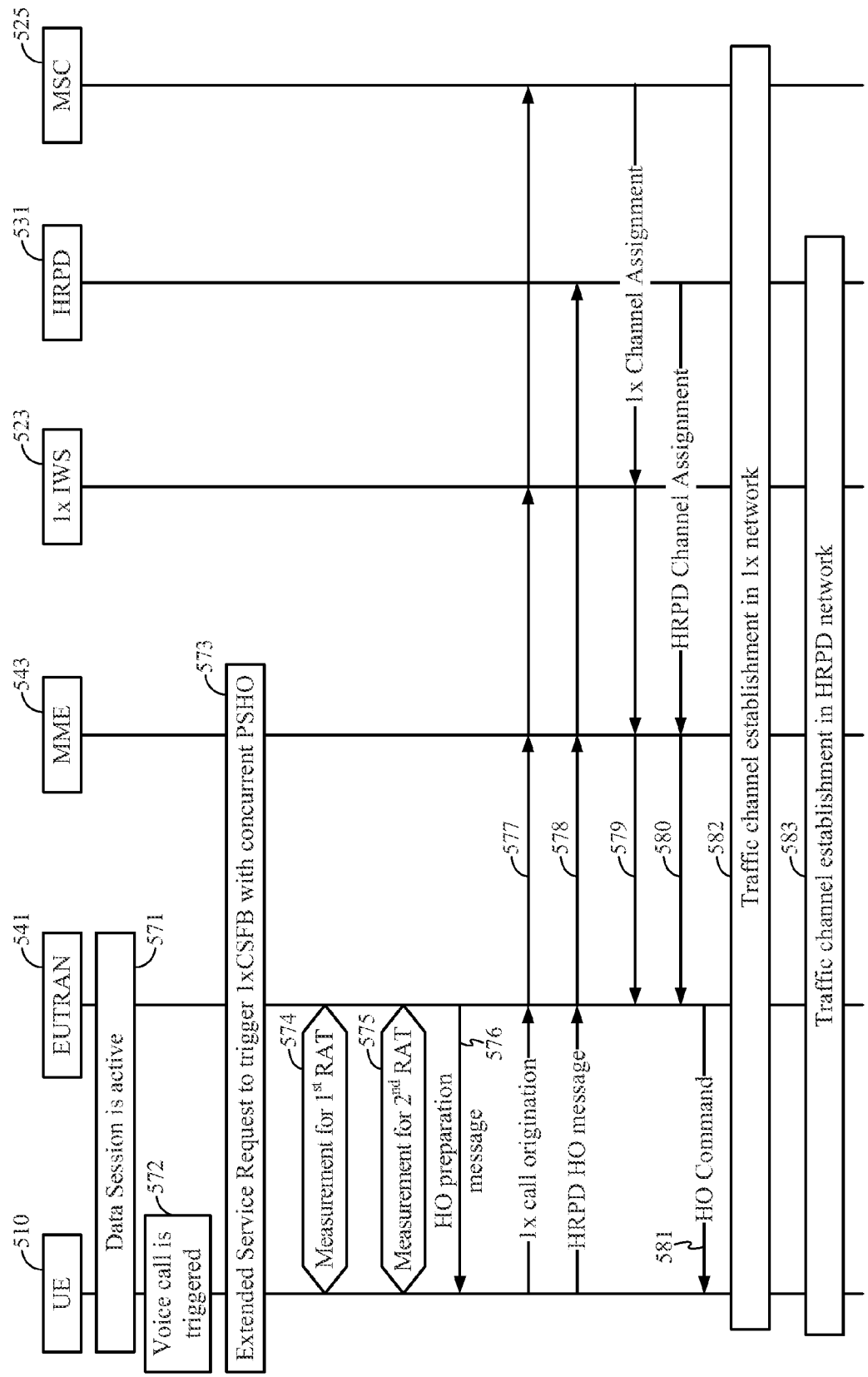
FIG. 5 is a signaling diagram illustrating communication within a wireless system in accordance with several aspects of methods disclosed herein.
Figure 6:
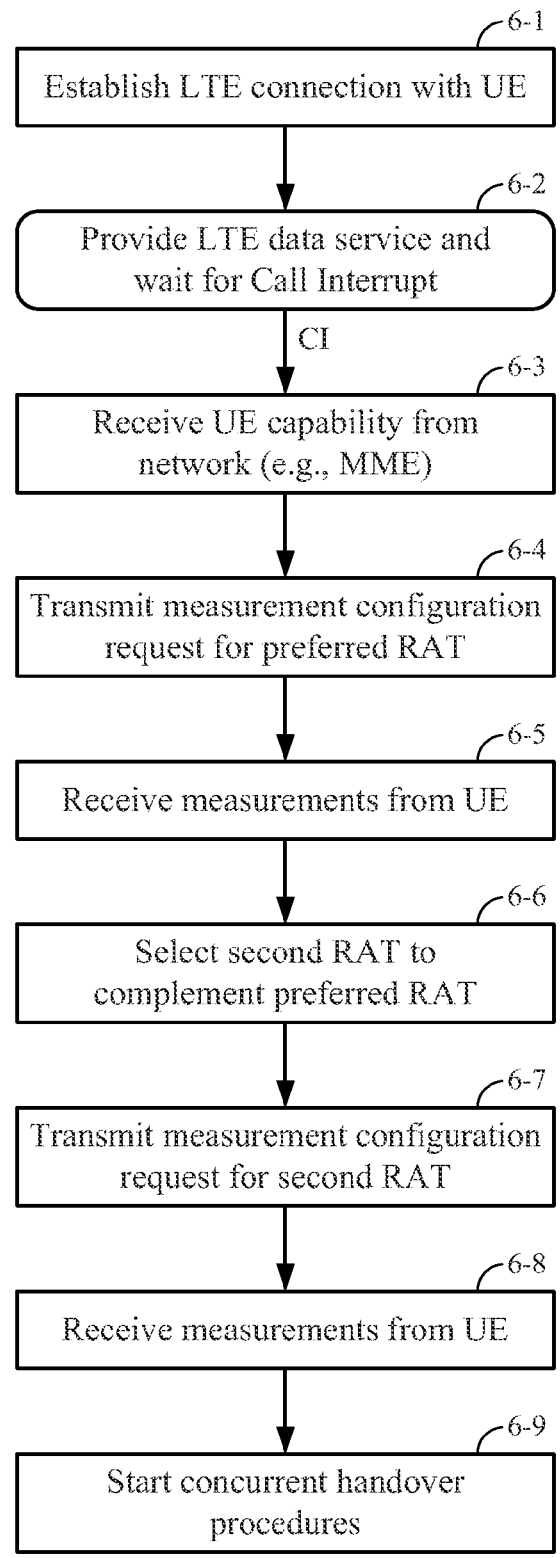
FIG. 6 is a flowchart illustrating a first method of enabling resource selection.
Figure 7:
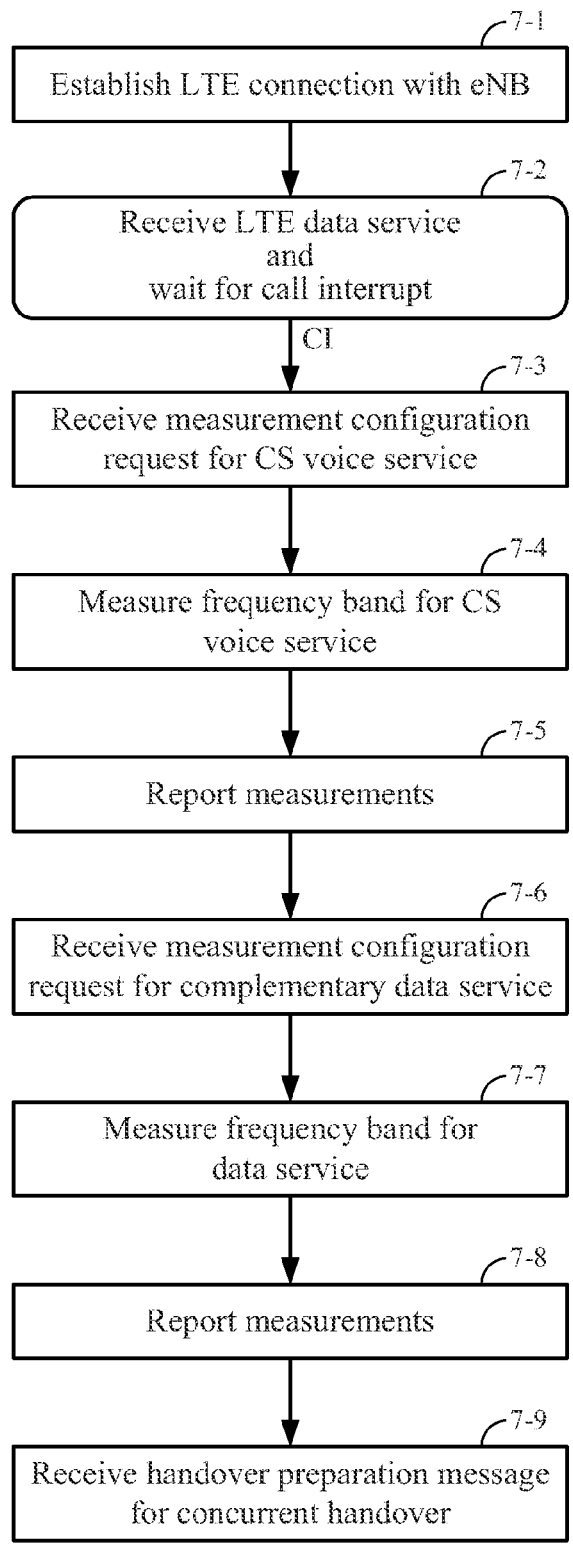
FIG. 7 is a flowchart illustrating a second method of enabling resource selection.

FIG. 5 is a signaling diagram illustrating communication between components of the system 500 illustrated in FIG. 4 in accordance with several aspects of methods disclosed herein with reference to FIGS. 6 and 7. Specifically, FIG. 5 depicts signaling to facilitate concurrent handover from the LTE PS network 540 to both the CS domain 520 and the HRPD network 530 in response to UE 510 originated request for CS voice service. As indicated by signal 571, the UE 510 has an active LTE PS link over which the UE 510 is able to receive LTE PS data service from the EUTRAN 541. In other words, the UE 510 is camped on the LTE PS network 540.

As indicated by signal 572, a voice call is triggered at the UE 510. As indicated by signal 573, the UE 510 sends an extended service request (ESR) requesting CS voice service to the EUTRAN 541, which is directed by the EUTRAN 541 to the MME 543. The MME 543 responds by sending the EUTRAN 541 a setup request message. As indicated by simplified signaling 574, the EUTRAN 541 sends the UE 510 a first measurement configuration message. Based on a predetermined prioritization of CS voice service, the EUTRAN directs the UE 510 to take measurements of 1× frequencies provided by the base station 521 during measurement gaps (typically 6 ms). In one embodiment, the EUTRAN 541 suspends LTE traffic to the UE 510 during the measurement gaps. After obtaining measurements, the UE 510 sends a first measurement report to the EUTRAN 541.

Based on the radio access capability of the UE 510 received from the MME 543, the EUTRAN 541 chooses an appropriate second radio access technology (RAT) that can be paired with the first radio access technology (e.g. 1×RTT on an 800 MHz channel). As indicated by signal 575, the EUTRAN 541 sends the UE 510 a second measurement configuration message that is paired to the first measurement configuration message based on the radio access capability of the UE 510. For example, if the UE 510 only supports intra-frequency dual access radio, the EUTRAN 541 configures HRPD measurements on the 800 MHz band. That is, based on a predetermined prioritization of CS voice service and the radio access capability of the UE 510, the EUTRAN directs the UE 510 to take measurements of HRPD channels provided by the HRPD AN 531. After obtaining measurements, the UE 510 sends a second measurement report to the EUTRAN 541.

As indicated by signal 576, in response to receiving the second measurement report, the EUTRAN 541 starts the concurrent handover procedure by transmitting a handover (HO) preparation message to the UE 510. As indicated by signals 577 and 578, the UE 510 responds with a 1× call origination message and an HRPD HO message, respectively. The 1× call origination message is tunneled to the MSC 525 through the EUTRAN 541, MME 543, and IWS 523 of the CS portion of the network. The HRPD HO message is tunneled to the HRPD AN 531 through the EUTRAN 541 and MME 543.

As indicated by signal 579, the MSC 525 provides a 1× traffic channel assignment for the UE 510. The 1× traffic assignment is initially tunneled to the EUTRAN 541 through the IWS 523 and the MME 543. As indicated by signal 580, the HRPD AN 531 provides a HRPD channel assignment for the UE 510. The 1× traffic assignment is initially tunneled to the EUTRAN 541 through the MME 543. Having received both the 1× traffic channel assignment and the HRPD channel assignment, as indicated by signal 581, the EUTRAN 541 sends a HO command to the UE 510. The HO command provides the UE 510 with the 1× traffic channel assignment and the HRPD channel assignment. As indicated by signaling 582, the UE 510 establishes the assigned 1× traffic channel with the CS domain 520 through the base station 521 by tuning to the assigned 1× traffic channel to enter a 1×RTT traffic mode. As indicated by signaling 583, the UE 510 establishes the assigned HRPD channel with the HRPD network 530 through the HRPD 531.

FIG. 6 is a flowchart illustrating a first method of enabling resource selection. In one embodiment, the first method is performed by an access point to enable concurrent handover from at least one radio access technology to at least two RATs. According to aspects of the first method, the access point directs an access terminal through sequential measurements, which are selected by the access point based on the radio access capability of the access terminal, service preferences of the user and measurement reports. In a complementary method described below with reference to FIG. 7, an access terminal obtains the sequential measurements chosen by the access point.

As represented by block 6-1, the method includes the access point establishing an LTE PS data service connection with an access terminal (e.g. a UE). As represented by block 6-2, the method includes providing the availability of LTE PS data service to the access terminal and waiting for a CS voice service interrupt. In response to receiving a call interrupt (CI path from 6-2), as represented by block 6-3, the method includes receiving the radio access capability of the access terminal from the core network (e.g. an MME). In one embodiment, the radio access capability is stored in the core network after it is reported by an access terminal during the registration procedure. Additionally and/or alternatively, the access point may receive the radio access capability of the access terminal from the core network when the LTE PS data service connection is established or from the access terminal.

As represented by block 6-4, the method includes transmitting a first measurement configuration request for a first preferred RAT. For example, based on a predetermined prioritization of CS voice service for the access terminal, the access point directs the access terminal to take measurements of 1× frequencies provided by a 1×RTT CS portion of the network. In one embodiment the access point suspends LTE PS traffic to the access terminal periodically during the measurement process. As represented by block 6-5, the method includes receiving a first measurement report from the access terminal.

As represented by block 6-6, the method includes selecting an appropriate second radio access technology (RAT) that can be paired with the first radio access technology (e.g. 1×RTT on an 800 MHz channel) based on the radio access capability of the access terminal. For example, if the access terminal only supports intra-frequency dual access radio, the access point configures HRPD measurements on the 800 MHz band. As represented by block 6-7, the method includes transmitting a second measurement configuration request for the selected second RAT. Again, in one embodiment, the access point suspends LTE PS traffic to the access terminal periodically during the measurement process.

As represented by block 6-8, the method includes receiving a second measurement report from the access terminal. As represented by block 6-9, the method includes using the first and second measurement reports the access terminal starts the concurrent handover procedure.

FIG. 7 is a flowchart illustrating a second method of enabling resource selection. As noted above, in one embodiment, the second method is performed by an access terminal (e.g. a UE) attempting to switch over from LTE PS data service to the combination CS voice service and HRPD data service. As represented by block 7-1, the method includes the access terminal establishing an LTE PS data service connection with an access point. As represented by block 7-2, the method includes receiving LTE PS data service from the access point and waiting for a CS voice service interrupt. In response to receiving a call interrupt (CI path from 7-2), as represented by block 7-3, the method includes receiving a first measurement configuration request for a first preferred RAT. For example, based on a predetermined prioritization of CS voice service for the access terminal, the access point directs the access terminal to take measurements of 1× frequencies provided by a 1×RTT CS portion of the network. In one embodiment the access point suspends LTE PS traffic to the access terminal periodically during the measurement process. As represented by block 7-4, the method includes obtaining measurements for the measurement objects specified in the first measurement configuration request. As represented by block 7-5, the method includes transmitting a first measurement report to the access point.

As represented by block 7-6, the method includes receiving a second measurement configuration request for the second radio access technology selected by the access point to complement the first RAT. Again, in one embodiment, the access point suspends LTE PS traffic to the access terminal periodically during the measurement process.

As represented by block 7-7, the method includes obtaining measurements for the measurement objects specified in the second measurement configuration request. As represented by block 7-8, the method includes transmitting a second measurement report to the access point. As represented by block 7-9, the method includes receiving a handover preparation message to start the concurrent handover procedure.

Figure 8:
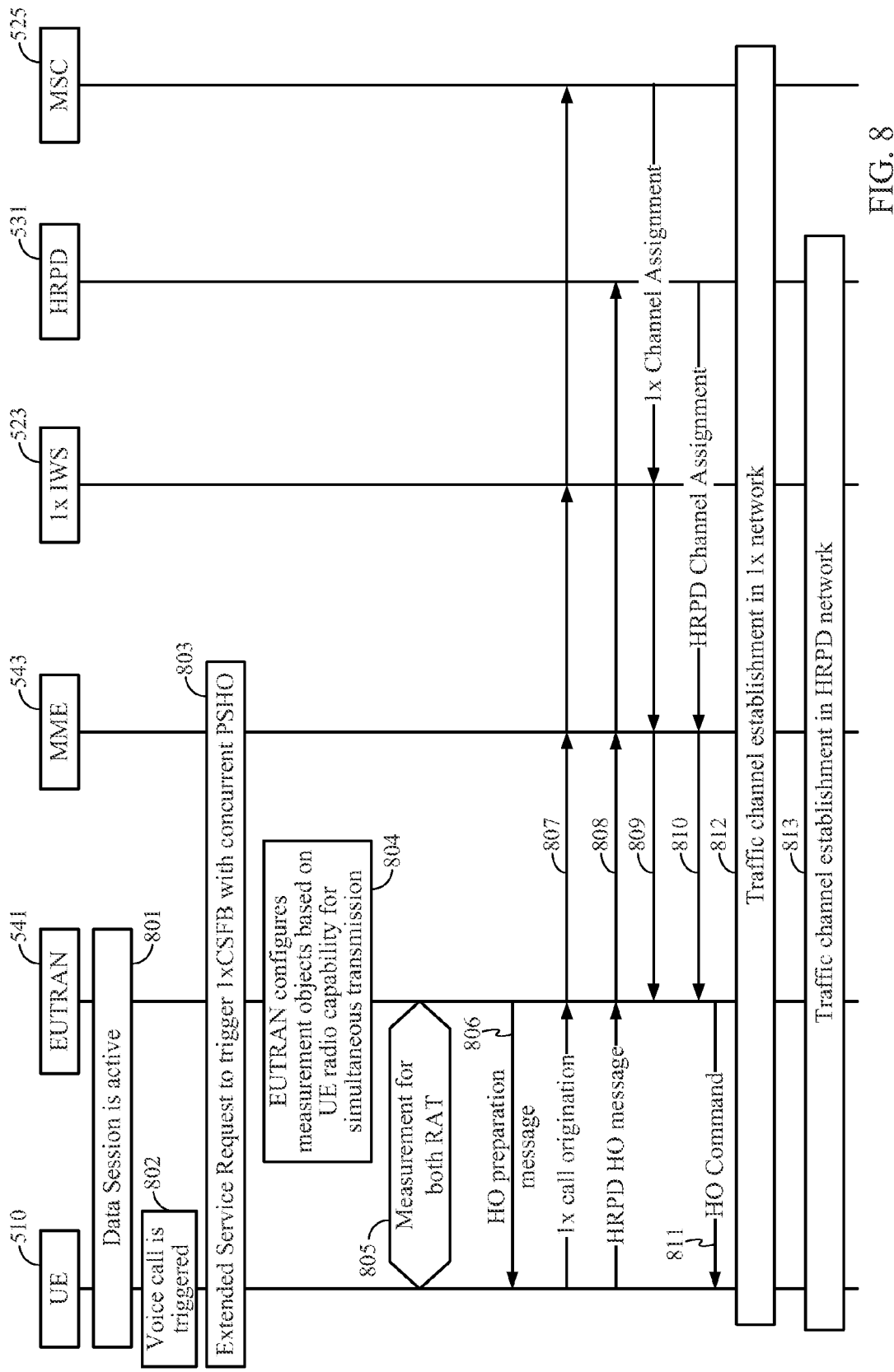
FIG. 8 is a signaling diagram illustrating communication within a wireless system in accordance with several aspects of methods disclosed herein.
Figure 9:
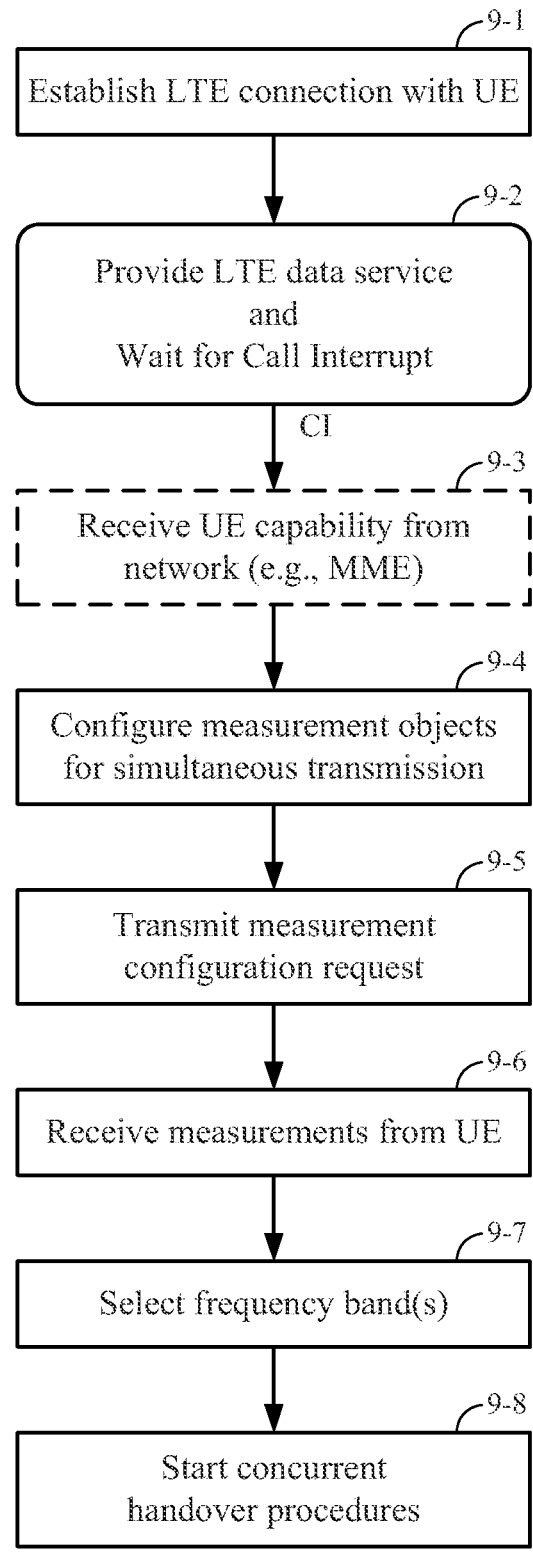
FIG. 9 is a flowchart illustrating a third method of enabling resource selection.
Figure 10:
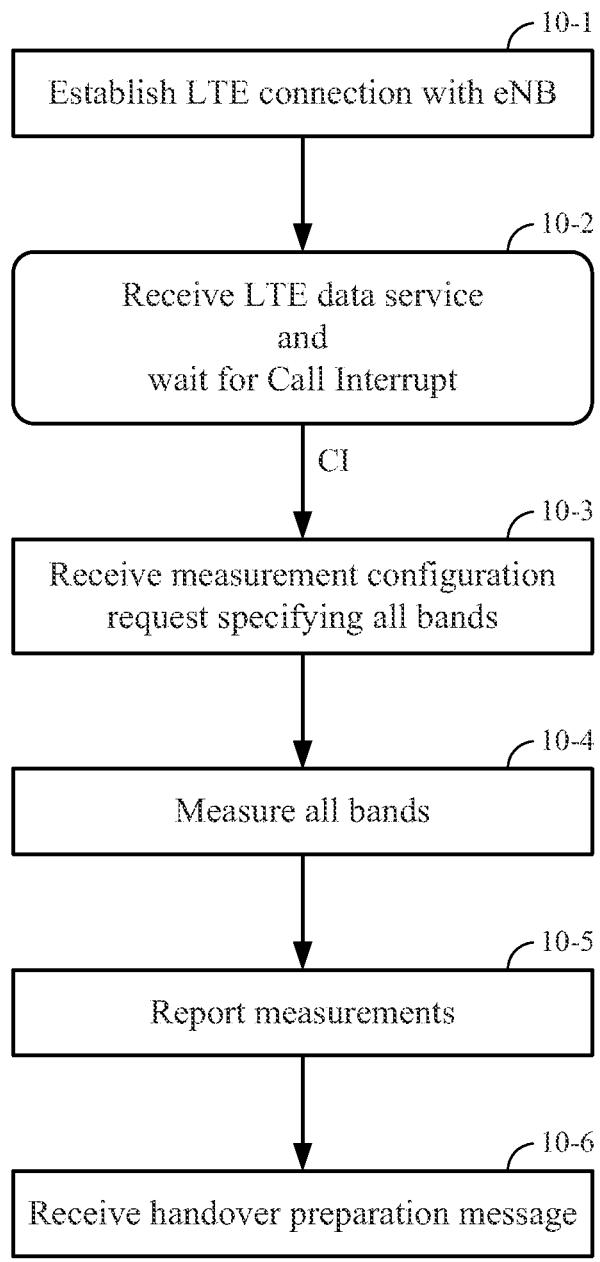
FIG. 10 is a flowchart illustrating a fourth method of enabling resource selection.

FIG. 8 is a signaling diagram illustrating communication between components of the system 500 illustrated in FIG. 4 in accordance with several aspects of methods disclosed herein with reference to FIGS. 9 and 10. Specifically, FIG. 8 depicts signaling to facilitate concurrent handover from the LTE PS network 540 to both the CS domain 520 and the HRPD network 530 in response to UE 510 originated request for CS voice service. As indicated by signal 801, the UE 510 has an active LTE PS link over which the UE 510 is able to receive LTE PS data service from the EUTRAN 541. In other words, the UE 510 is camped on the LTE PS network 540.

As indicated by signal 802, a voice call is triggered at the UE 510. As indicated by signal 803 the UE 510 sends an extended service request (ESR) requesting CS voice service to the EUTRAN 541, which is directed by the EUTRAN 541 to the MME 543. The MME 543 responds by sending the EUTRAN 541 a setup request message.

As indicated by block 804, the EUTRAN 541 configures measurement objects based on the radio access capability of the UE 510 for simultaneous (i.e. dual radio) transmissions. However, in one embodiment, even if the UE 510 only supports intra-frequency dual radio communication, the EUTRAN configures the measurement objects so that the UE 510 is directed to perform measurements on all bands. As indicated by simplified signaling 805, the EUTRAN 541 sends the UE 510 a measurement configuration message that includes measurement objects associated with two or more RATs. Again, in one embodiment the EUTRAN 541 suspends LTE traffic to the UE 510 periodically during the measurement process. After obtaining measurements, the UE 510 sends a measurement report to the EUTRAN 541.

As indicated by signal 806, in response to receiving the measurement report, the EUTRAN 541 selects a preferred combination of RATs and starts the concurrent handover procedure by transmitting a handover (HO) preparation message to the UE 510. As indicated by signals 807 and 808, the UE 510 responds with a 1× call origination message and a HRPD HO message, respectively. The 1× call origination message is tunneled to the MSC 525 through the EUTRAN 541, MME 543, and IWS 523 of the CS portion of the network. The HRPD HO message is tunneled to the HRPD AN 531 through the EUTRAN 541 and MME 543.

As indicated by signal 809, the MSC 525 provides a 1× traffic channel assignment for the UE 510. The 1× traffic assignment is initially tunneled to the EUTRAN 541 through the IWS 523 and the MME 543. As indicated by signal 810, the HRPD AN 531 provides a HRPD channel assignment for the UE 510. The 1× traffic assignment is initially tunneled to the EUTRAN 541 through the MME 543. Having received both the 1× traffic channel assignment and the HRPD channel assignment, as indicated by signal 811, the EUTRAN 541 sends an HO command to the UE 510. The HO command provides the UE 510 with the 1× traffic channel assignment and the HRPD channel assignment. As indicated by signaling 812, the UE 510 establishes the assigned 1× traffic channel with the CS domain 520 through the base station 521 by tuning to the assigned 1× traffic channel to enter a 1×RTT traffic mode. As indicated by signaling 813, the UE 510 establishes the assigned HRPD channel with the HRPD network 530 through the HRPD 531.

FIG. 9 is a flowchart illustrating a third method of enabling resource selection. In one embodiment, the third method is performed by an access point to enable concurrent handover from at least one radio access technology to at least two RATs. According to aspects of the third method, the access point directs an access terminal through a set of measurements, which are selected by the access point based on the radio access capability of the access terminal and service preferences of the user. In a complementary method described below with reference to FIG. 10, an access terminal obtains the measurements chosen by the access point.

As represented by block 9-1, the method includes the access point establishing an LTE PS data service connection with an access terminal (e.g. a UE). As represented by block 9-2, the method includes providing the availability of LTE PS data service to the access terminal and waiting for a CS voice service interrupt. In response to receiving a call interrupt (CI path from 9-2), as represented by block 9-3, the method optionally includes receiving the radio access capability of the access terminal from the core network (e.g. an MME). Additionally and/or alternatively, the access point may receive the radio access capability of the access terminal from the core network when the LTE PS data service connection is established or from the access terminal.

As represented by block 9-4, the method includes configuring measurement objects based on the radio access capability of the access terminal for simultaneous (i.e. dual radio)

transmissions. However, in one embodiment, even if the access terminal only supports intra-frequency dual radio communication, the access point configures the measurement objects so that the access terminal is directed to perform measurements on all bands.

As represented by block 9-5, the method includes transmitting a measurement configuration request including the measurement objects. In one embodiment the access point suspends LTE PS traffic to the access terminal periodically during the measurement process. As represented by block 9-6, the method includes receiving a measurement report from the access terminal. As represented by block 9-7, the method includes selecting an appropriate combination of the first and second RATs based on the radio access capability of the access terminal and the measurement report. As represented by block 9-8, the method includes using the first and second measurement reports to start the concurrent handover procedure.

FIG. 10 is a flowchart illustrating a fourth method of enabling resource selection. As noted above, in one embodiment, the fourth method is performed by an access terminal attempting to switch over from LTE PS data service to the combination CS voice service and HRPD data service. As represented by block 10-1, the method includes the access terminal establishing an LTE PS data service connection with an access point. As represented by block 10-2, the method includes receiving LTE PS data service from the access point and waiting for a CS voice service interrupt. In response to receiving a call interrupt (CI path from 10-2), as represented by block 10-3, the method includes receiving a measurement configuration request specifying two or more measurement objects. As represented by block 10-4, the method includes obtaining measurements for the measurement objects specified in the measurement configuration request. As represented by block 10-5, the method includes transmitting a measurement report to the access point. As represented by block 10-6, the method includes receiving a handover preparation message to start the concurrent handover procedure.

Figure 11:
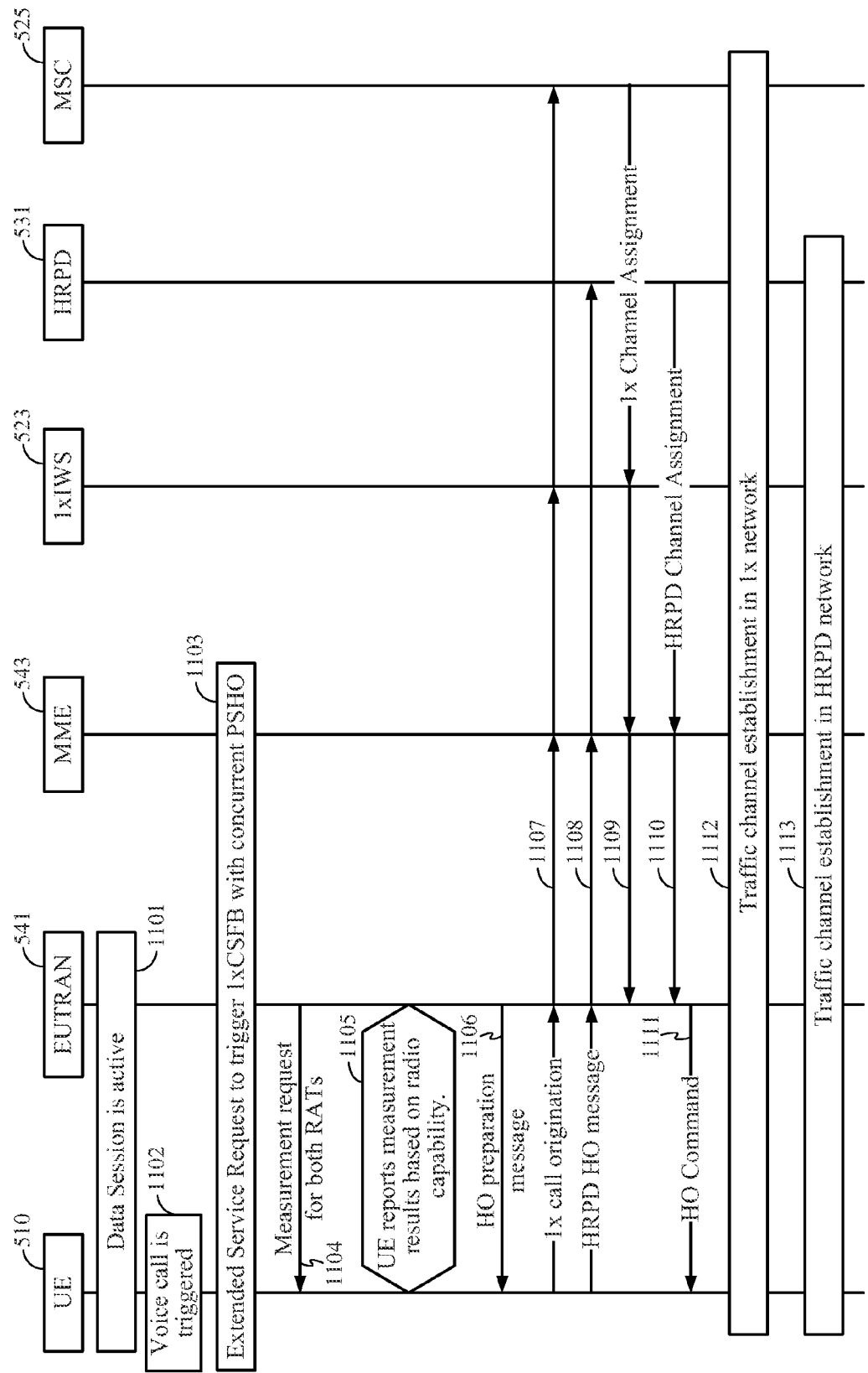
FIG. 11 is a signaling diagram illustrating communication within a wireless system in accordance with several aspects of methods disclosed herein.
Figure 12:
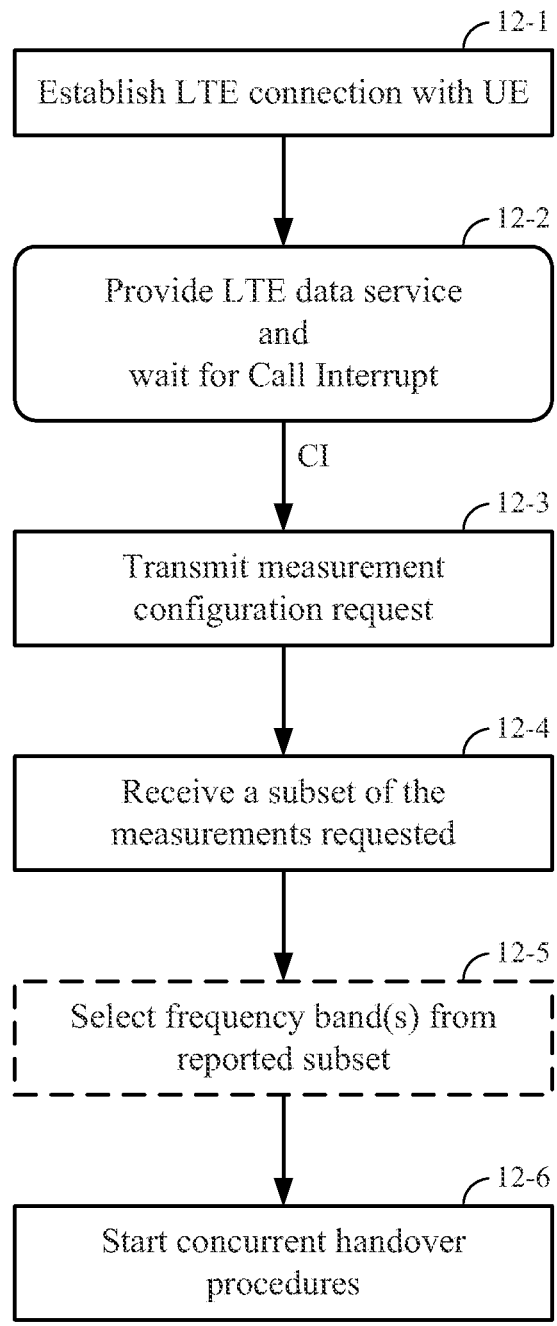
FIG. 12 is a flowchart illustrating a fifth method of enabling resource selection.
Figure 13:
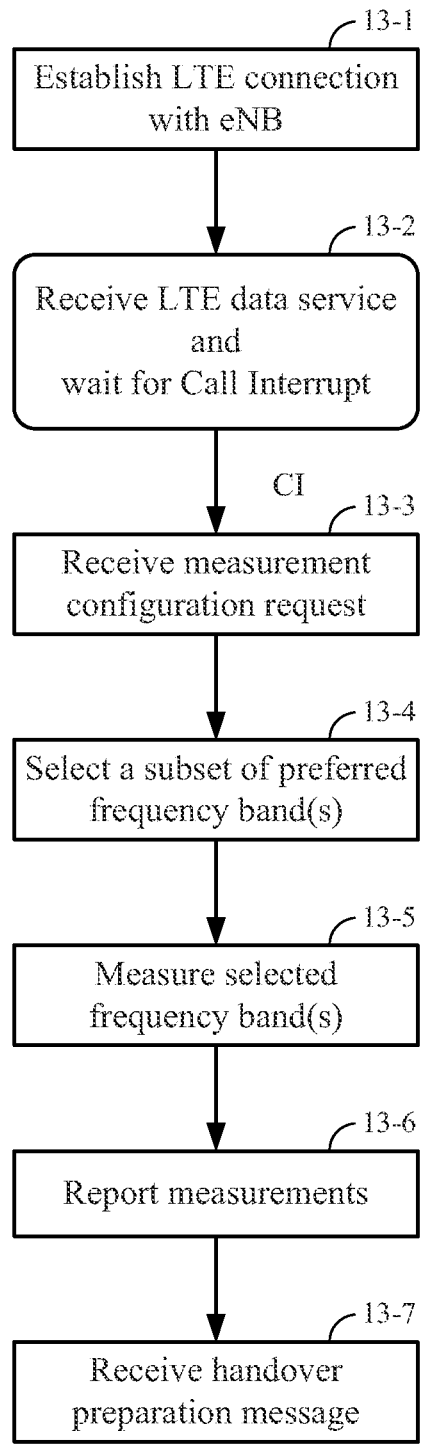
FIG. 13 is a flowchart illustrating a sixth method of enabling resource selection.
Figure 14:
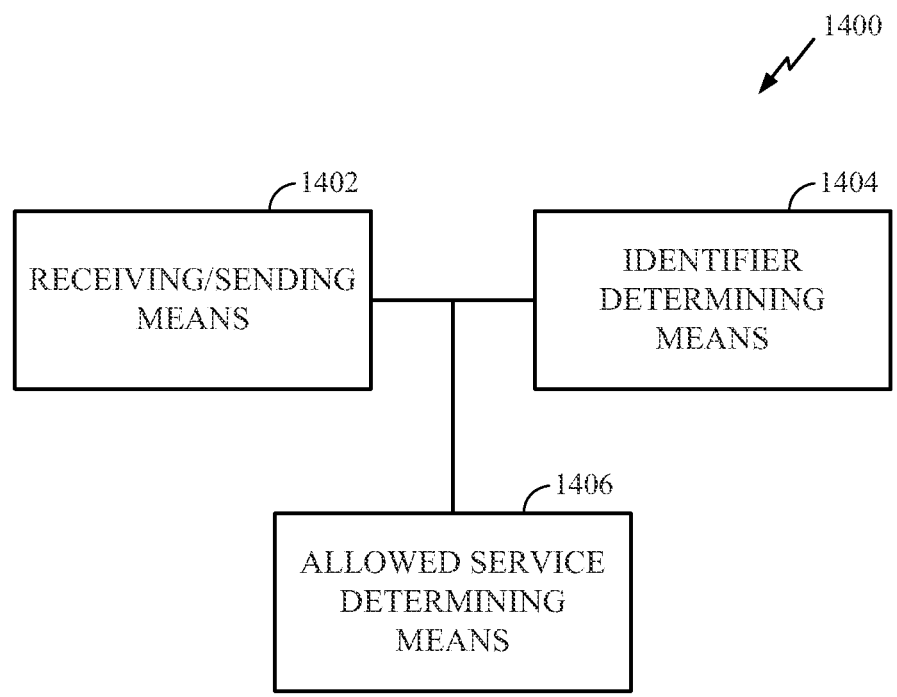
FIGS. 14-24 are simplified block diagrams of several sample aspects of apparatuses configured to provide provisioning and/or access management as taught herein.
Figure 15:
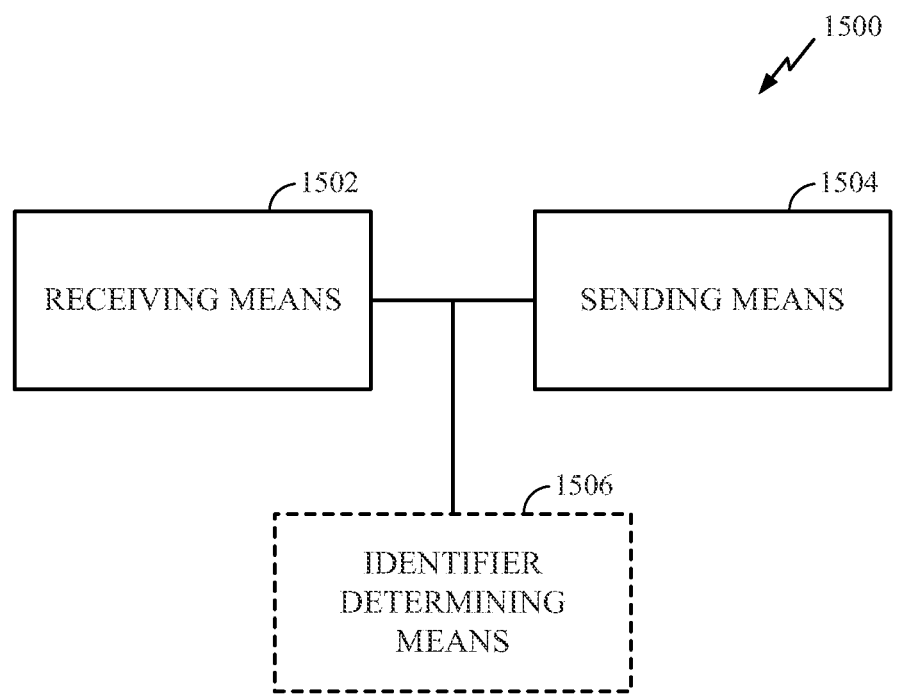
Figure 16:
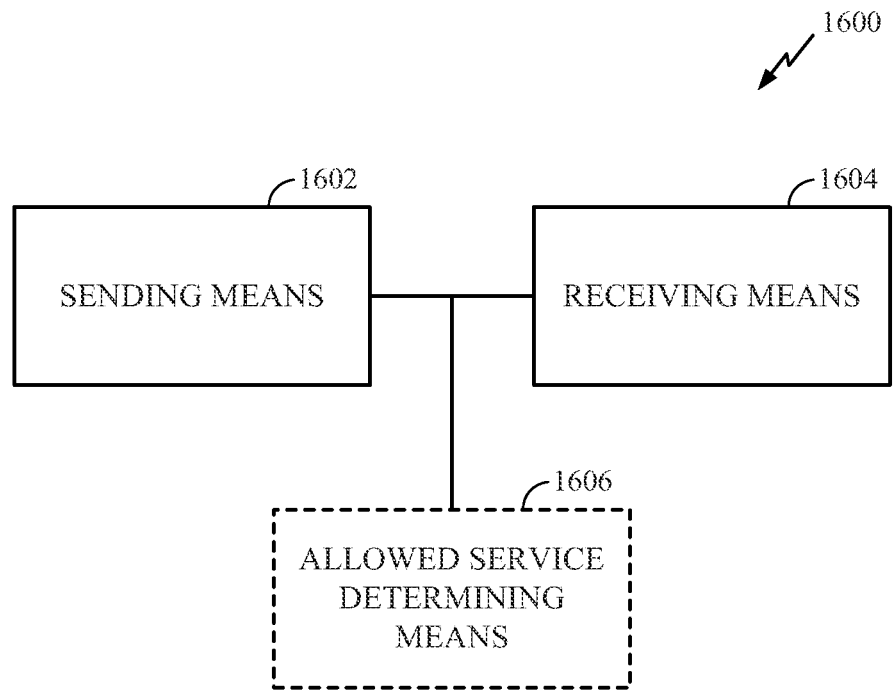
Figure 17:
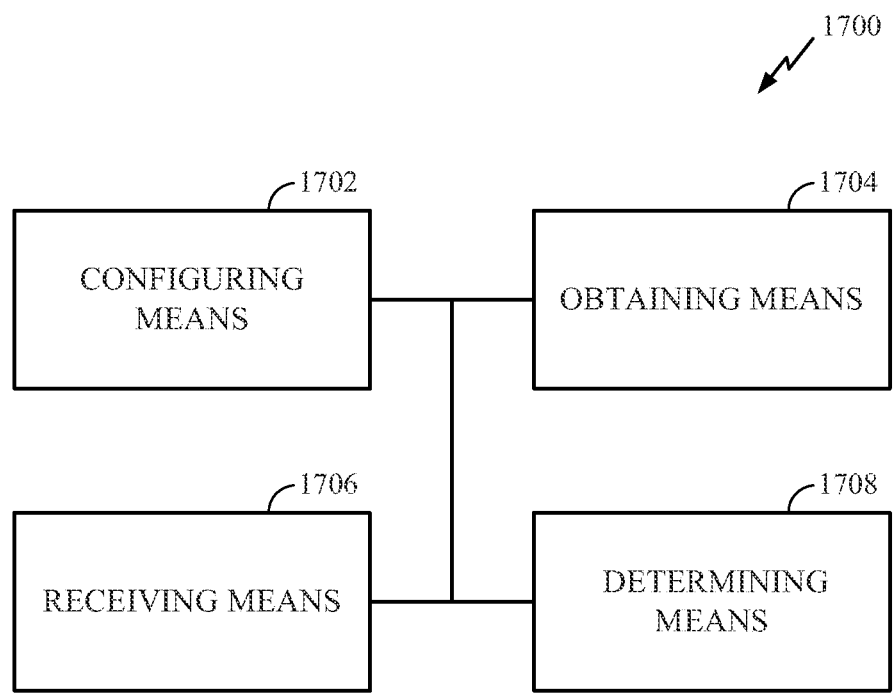
Figure 18:
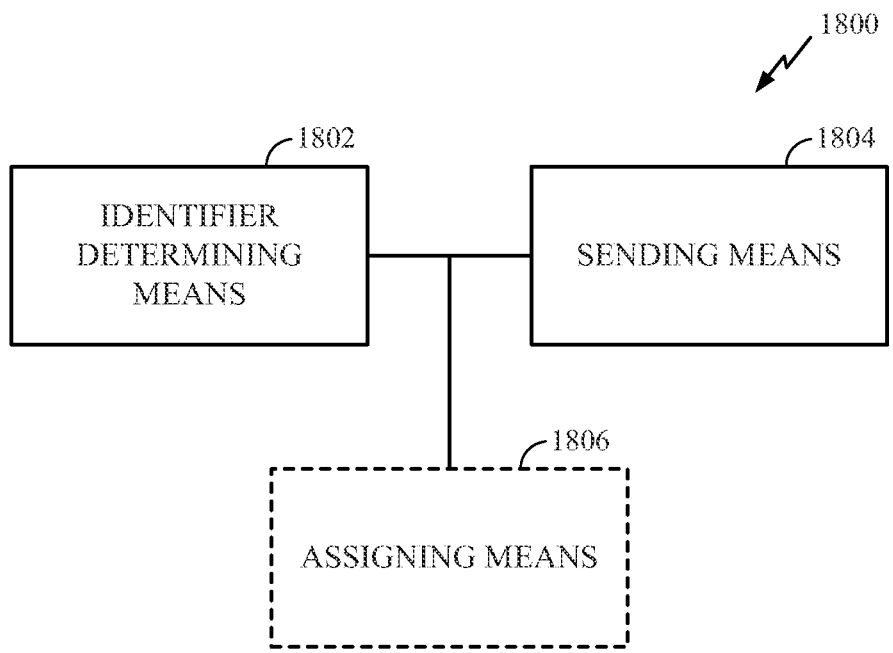
Figure 19:
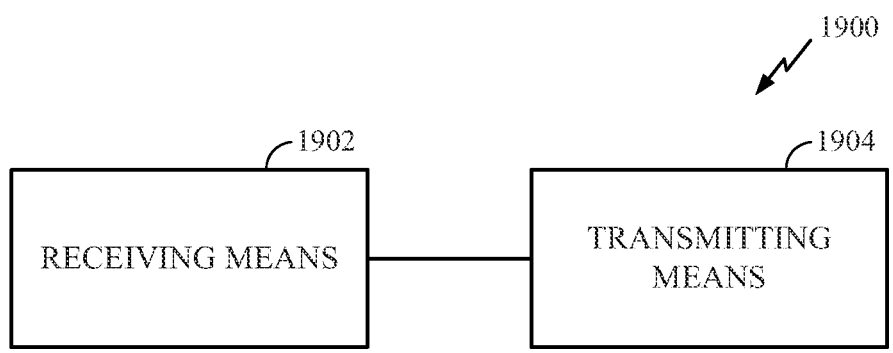
Figure 20:
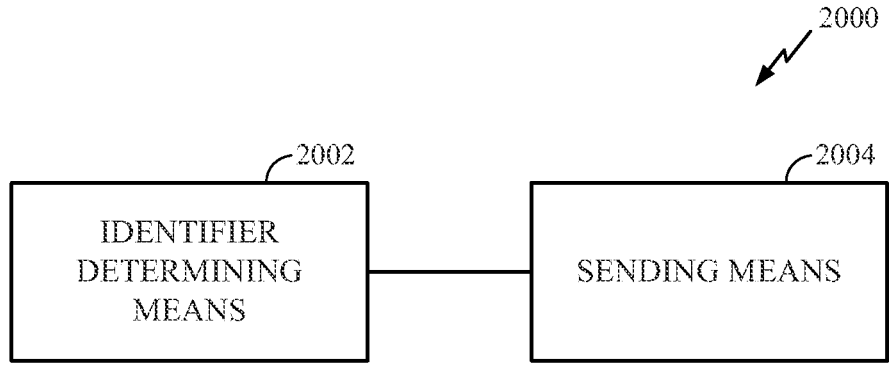
Figure 21:
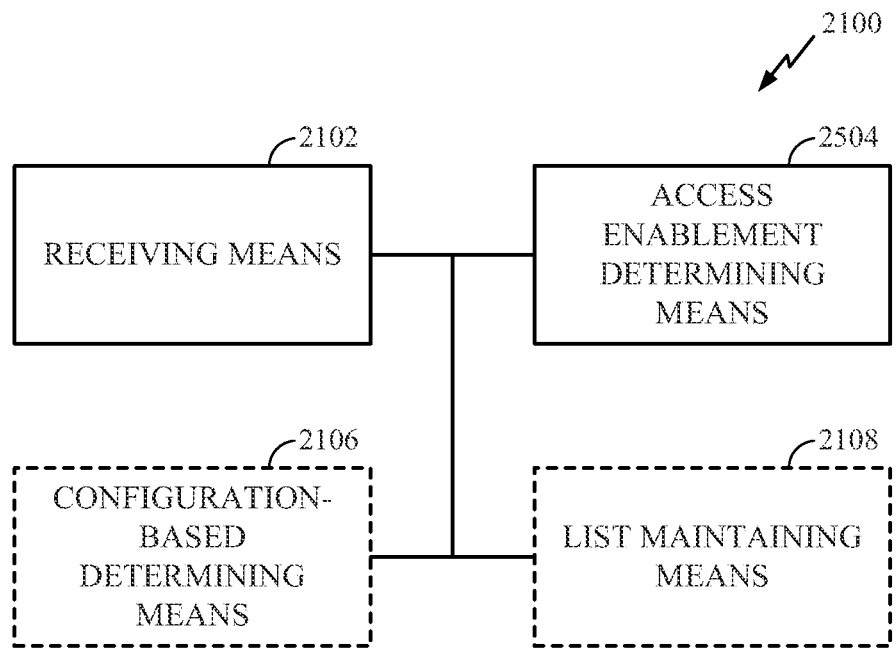
Figure 22:
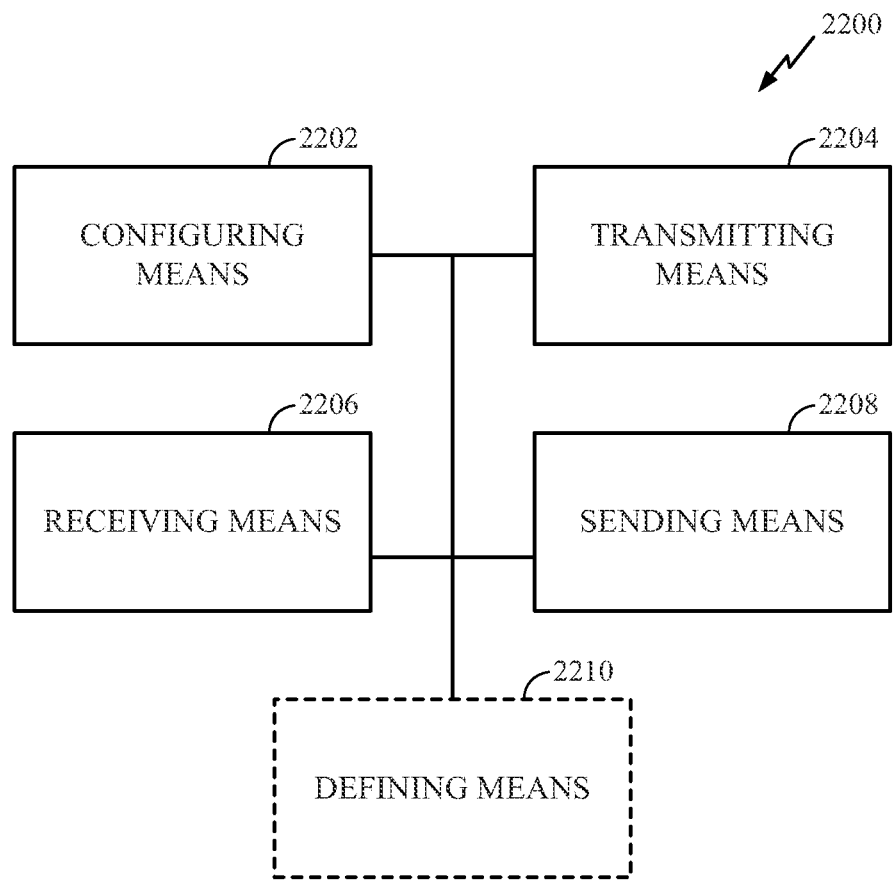
Figure 23:
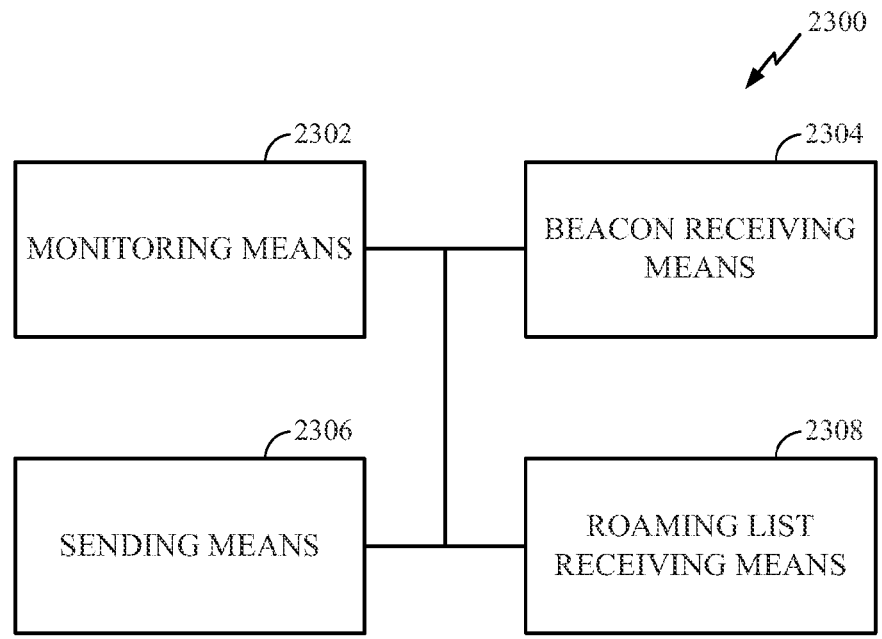
Figure 24:
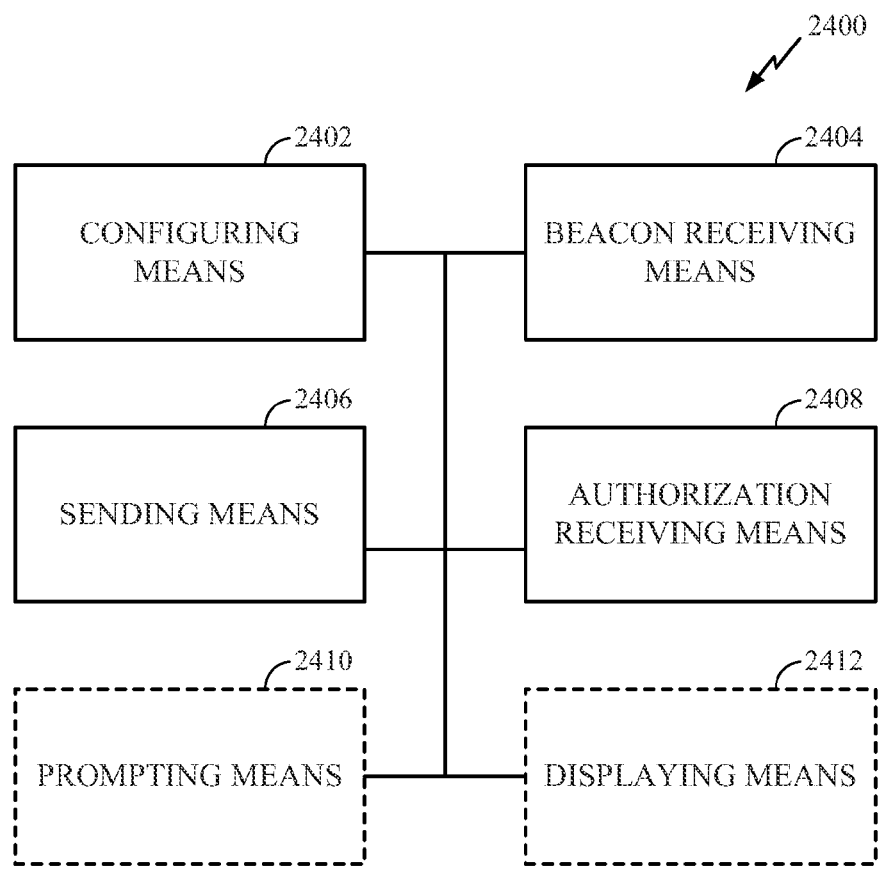

FIG. 11 is a signaling diagram illustrating communication between components of the system 500 illustrated in FIG. 4 in accordance with several aspects of methods disclosed herein with reference to FIGS. 12 and 13. Specifically, FIG. 11 depicts signaling to facilitate concurrent handover from the LTE PS network 540 to both the CS domain 520 and the HRPD network 530 in response to UE 510 originated request for CS voice service. As indicated by signal 1101, the UE 510 has an active LTE PS link over which the UE 510 is able to receive LTE PS data service from the EUTRAN 541. In other words, the UE 510 is camped on the LTE PS network 540.

As indicated by signal 1102, a voice call is triggered at the UE 510. As indicated by signal 1103 the UE 510 sends an extended service request (ESR) requesting CS voice service to the EUTRAN 541, which is directed by the EUTRAN 541 to the MME 543. The MME 543 responds by sending the EUTRAN 541 a setup request message.

As indicated by block 1104, the EUTRAN 541 sends the UE 510 a measurement configuration message that includes measurement objects associated with two or more RATs. In one embodiment, the EUTRAN 541 does not consider the radio access capability of the UE 510 for simultaneous (i.e. dual radio) transmissions to configure the measurement objects. Again, in one embodiment the EUTRAN 541 suspends LTE traffic to the UE 510 periodically during the measurement process. However, as indicated by simplified signaling 1105, the UE 510 selects which measurement objects to obtain measurements for based on the radio access capability of the UE 510 for simultaneous (i.e. dual radio) transmissions and optionally user preferences. In other words, in one embodiment, the UE 510 selects a subset of measurement objects to obtain measurements for without direction from the EUTRAN 541. After obtaining the subset of measurements, the UE 510 sends a measurement report to the EUTRAN 541. In one embodiment, measurement objects that were ignored are reported having null or invalid measurement values, so that radio access technology resources with those measurement values are not selected by the EUTRAN 541 in the handover process.

As indicated by signal 1106, in response to receiving the second measurement report, the EUTRAN 541 selects a preferred combination of RATs from the validly reported measurements and starts the concurrent handover procedure by transmitting a handover (HO) preparation message to the UE 510. As indicated by signals 1107 and 1108, the UE 510 responds with a 1× call origination message and an HRPD HO message, respectively. The 1× call origination message is tunneled to the MSC 525 through the EUTRAN 541, MME 543, and IWS 523 of the CS portion of the network. The HRPD HO message is tunneled to the HRPD AN 531 through the EUTRAN 541 and MME 543.

As indicated by signal 1109, the MSC 525 provides a 1× traffic channel assignment for the UE 510. The 1× traffic assignment is initially tunneled to the EUTRAN 541 through the IWS 523 and the MME 543. As indicated by signal 1110, the HRPD AN 531 provides a HRPD channel assignment for the UE 510. The 1× traffic assignment is initially tunneled to the EUTRAN 541 through the MME 543. Having received both the 1× traffic channel assignment and the HRPD channel assignment, as indicated by signal 1111, the EUTRAN 541 sends a HO command to the UE 510. The HO command provides the UE 510 with the 1× traffic channel assignment and the HRPD channel assignment. As indicated by signaling 1112, the UE 510 establishes the assigned 1× traffic channel with the CS domain 520 through the base station 521 by tuning to the assigned 1× traffic channel to enter a 1×RTT traffic mode. As indicated by signaling 1113, the UE 510 establishes the assigned HRPD channel with the HRPD network 530 through the HRPD 531.

FIG. 12 is a flowchart illustrating a fifth method of enabling resource selection. In one embodiment, the fifth method is performed by an access point to enable concurrent handover from at least one radio access technology to at least two RATs. According to aspects of the fifth method, the access point receives valid measurements for a subset of the measurement objects selected by the access point. In a complementary method described below with reference to FIG. 13, an access terminal selects which subset of measurements to obtain based on the radio access capability of the access terminal and optionally service preferences of the user.

As represented by block 12-1, the method includes the access point establishing an LTE PS data service connection with an access terminal. As represented by block 12-2, the method includes providing the availability of LTE PS data service to the access terminal and waiting for a CS voice service interrupt. In response to receiving a call interrupt (CI path from 12-2), as represented by block 12-3, the method includes transmitting a measurement configuration request including the measurement objects. In one embodiment the access point suspends LTE PS traffic to the access terminal periodically during the measurement process. As represented by block 12-4, the method includes receiving a measurement report from the access terminal including measurements for a subset of the measurement objects specified in the measurement configuration request. As represented by block 12-5, the method optionally includes selecting an appropriate combination of the first and second RATs based on the radio access capability of the access terminal and the measurement report provided by the access terminal. In one embodiment, the access terminal provides only valid measurement for a preferred combination of first and second RATs, thereby preventing the access point from making any selections with respect to the first and second RATs. As represented by block 12-6, the method includes using the measurement report to start the concurrent handover procedure.

FIG. 13 is a flowchart illustrating a sixth method of enabling resource selection. As noted above, in one embodiment, the sixth method is performed by an access terminal attempting to switch over from LTE PS data service to the combination CS voice service and HRPD data service. As represented by block 13-1, the method includes the access terminal establishing an LTE PS data service connection with an access point. As represented by block 13-2, the method includes receiving LTE PS data service from the access point and waiting for a CS voice service interrupt. In response to receiving a call interrupt (CI path from 13-2), as represented by block 13-3, the method includes receiving a measurement configuration request specifying two or more measurement objects. As represented by block 13-4, the method includes selecting a subset of the measurement objects based on the radio access capability of the access terminal and/or service preferences of the user. As represented by block 13-5, the method includes obtaining measurements for the selected subset of measurement objects specified in the measurement configuration request. As represented by block 13-6, the method includes transmitting a measurement report to the access point. As represented by block 13-7, the method includes receiving a handover preparation message to start the concurrent handover procedure.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 14-24, apparatuses 1400, 1500, 1600, 1700, 1800, 1900, 2000, 2100, 2200, 2300, and 2400 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 14-24 are optional.

The apparatuses 1400, 1500, 1600, 1700, 1800, 1900, 2000, 2100, 2200, 2300, and 2400 may include one or more modules that may perform one or more of the functions described above with regard to various figures. For example, a receiving/sending means 1402 may correspond to, for example, a communication controller as discussed herein. An identifier determining means 1404 may correspond to, for example, an access controller as discussed herein. An allowed service determining means 1406 may correspond to, for example, an access controller as discussed herein. A receiving means 1502 may correspond to, for example, a communication controller as discussed herein. A sending means 1504 may correspond to, for example, an access controller as discussed herein. An identifier determining means 1506 may correspond to, for example, an access controller as discussed herein. A sending means 1602 may correspond to, for example, an access controller as discussed herein. A receiving means 1604 may correspond to, for example, a communication controller as discussed herein. An allowed service determining means 1606 may correspond to, for example, an access controller as discussed herein. A configuring means 1702 may correspond to, for example, a provisioning controller as discussed herein. An obtaining means 1704 may correspond to, for example, an access controller as discussed herein. A receiving means 1706 may correspond to, for example, a communication controller as discussed herein. A determining means 1708 may correspond to, for example, an access controller as discussed herein. An identifier determining means 1802 may correspond to, for example, an provisioning controller as discussed herein. A sending means 1804 may correspond to, for example, a communication controller as discussed herein. An assigning means 1806 may correspond to, for example, an provisioning controller as discussed herein. A receiving means 1902 may correspond to, for example, a provisioning controller as discussed herein. A transmitting means 1904 may correspond to, for example, a communication controller as discussed herein. An identifier determining means 2002 may correspond to, for example, a provisioning controller as discussed herein. A sending means 2004 may correspond to, for example, a communication controller as discussed herein. A receiving means 2102 may correspond to, for example, a communication controller as discussed herein. An access enablement determining means 2104 may correspond to, for example, an access controller as discussed herein. A configuration-based determining means 2106 may correspond to, for example, an access controller as discussed herein. A list maintaining means 2108 may correspond to, for example, an access controller as discussed herein. A configuring means 2202 may correspond to, for example, a provisioning controller as discussed herein. A transmitting means 2204 may correspond to, for example, a communication controller as discussed herein. A receiving means 2206 may correspond to, for example, a communication controller as discussed herein. A sending means 2208 may correspond to, for example, a provisioning controller as discussed herein. A defining means 2210 may correspond to, for example, a provisioning controller as discussed herein. A monitoring means 2302 may correspond to, for example, a receiver as discussed herein. A beacon receiving means 2304 may correspond to, for example, a receiver as discussed herein. A sending means 2306 may correspond to, for example, a communication controller as discussed herein. A roaming list receiving means 2308 may correspond to, for example, a provisioning controller as discussed herein. A configuring means 2402 may correspond to, for example, a provisioning controller as discussed herein. A beacon receiving means 2404 may correspond to, for example, a receiver as discussed herein. A sending means 2406 may correspond to, for example, a communication controller as discussed herein. An authorization receiving means 2408 may correspond to, for example, an access controller as discussed herein. A prompting means 2410 may correspond to, for example, an access controller as discussed herein. A displaying means 2412 may correspond to, for example, an access controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of handover from a first radio access technology, the method comprising:
    receiving a request for a second radio access technology on a second frequency band, wherein accessing the second radio access technology causes a change in the capability of an access terminal to receive the first radio access technology;
    preparing a first measurement request associated with providing the second radio access technology utilizing an indicator of a dual radio access capability of the access terminal;
    transmitting the first measurement request to the access terminal;
    receiving a first measurement report from the access terminal;
    selecting a preferred delivery for a third radio access technology utilizing the first measurement report provided by the access terminal;
    preparing a second measurement request associated with providing the third radio access technology utilizing the first measurement report;
    transmitting the second measurement request to the access terminal;
    receiving a second measurement report from the access terminal, wherein the second measurement report comprises at least one measurement;
    selecting, utilizing the first measurement report, the third radio access technology on a third frequency band to replace the first radio access technology; and
    initiating a concurrent handover from the first radio access technology to the second and the third radio access technology.

2. The method of claim 1, wherein the request indicates that the access terminal is eligible for communicating via the second radio access technology.

3. The method of claim 1, wherein the second frequency band and the third frequency band are one of intra-frequency bands in relation to one another or inter-frequency bands in relation to one another.

4. The method of claim 1, wherein the first radio access technology comprises long term evolution (LTE) data service, the second radio access technology comprises a circuit-switched voice service and the third radio access technology comprises an intra-frequency data service.

5. The method of claim 1, wherein the preferred delivery of the third radio access technology is compatible with a preferred delivery of the second radio access technology and the dual radio access capability of the access terminal.

6. The method of claim 1, further comprising:
    preparing the first measurement request to include a request to measure a plurality of frequency bands, wherein the plurality of frequency bands include candidates for a preferred delivery of the second radio access technology and the preferred delivery for the third radio access technology; and
    selecting the respective preferred deliveries for the second radio access technology and the third radio access technology utilizing the first measurement report provided by the access terminal.

7. The method of claim 6, wherein the plurality of frequency bands comprises the available frequency bands on which the second radio access technology is provided.

8. The method of claim 6, wherein the first measurement report comprises measurements for a subset of the plurality of frequency bands for which measurements were requested in the first measurement request.

9. A method of concurrent handoff enabling dual radio capability within an access terminal, the method comprising:
    communicating with a first radio access technology on a first frequency band from an access point;
    transmitting a request for a second radio access technology provided on a second frequency band, wherein participating in the reception of the second radio access technology is not compatible with the capability of the access terminal to receive the first radio access technology;
    receiving a first measurement request;
    obtaining at least one measurement;
    transmitting a first measurement report to the access point, wherein the first measurement report comprises at least one measurement;
    receiving a second measurement request, for a preferred delivery of a third radio access technology in response to transmitting the first measurement report;
    obtaining at least one measurement in response to the second measurement request;
    transmitting a second measurement report to the access point, wherein the second measurement report comprises at least one measurement; and
    receiving a handoff initiation message, initiating a concurrent handover from the first radio access technology to the second radio access technology and the third radio access technology on a third frequency band, from the access point.

10. The method of claim 9, wherein the request indicates that the access terminal is a proposed participant for the reception of the second radio access technology.

11. The method of claim 9, wherein the second frequency band and the third frequency band are one of intra-frequency bands in relation to one another or inter-frequency bands in relation to one another.

12. The method of claim 9, wherein the first radio access technology comprises long term evolution (LTE) data service, the second radio access technology comprises a circuit-switched voice service and the third radio access technology comprises a high rate packet data service.

13. The method of claim 9, wherein the preferred delivery of the third radio access technology is compatible with a preferred delivery of the second radio access technology and the dual radio access capability of the access terminal.

14. The method of claim 9, wherein obtaining at least one measurement in response to the first measurement request comprises obtaining at least one measurement for the second frequency band and at least one measurement for the third frequency band.

15. The method of claim 9 further comprising:
selecting a subset of the frequency bands specified in the first measurement request; and
obtaining measurements for the subset of frequency bands specified in the first measurement request, and wherein the first measurement report comprises measurements for a subset of the plurality of frequency bands for which measurements have been requested in the first measurement request.

16. The method of claim 15, wherein obtaining measurements for a subset of the frequency bands specified in the first measurement request comprises obtaining measurements of a single frequency band.

17. A wireless access point comprising:
means for receiving, wherein said receiving means are configured to receive a request for a second radio access technology on a second frequency band, wherein accessing the second radio access technology causes a change in the capability of an access terminal to receive a first radio access technology, and receive a first measurement report from the access terminal;
means for preparing a first measurement request associated with providing a second radio access technology utilizing an indicator of a dual radio access capability of the access terminal;
means for transmitting the first measurement request to the access terminal;
means for selecting, utilizing the first measurement report, a third radio access technology on a third frequency band to replace the first radio access technology, wherein the means for selecting is further configured to select a preferred delivery of the third radio access technology utilizing the first measurement report; and
means for initiating a concurrent handover from the first radio access technology to the second and the third radio access technology, wherein the second frequency band and the third frequency band are one of intra-frequency bands in relation to one another or inter-frequency bands in relation to one another, and
wherein the means for preparing is further configured to prepare a second measurement request associated with providing the third radio access technology utilizing the first measurement report, and
wherein the means for transmitting is further configured to transmit the second measurement request to the access terminal, and
wherein the means for receiving is further configured to receive a second measurement report from the access terminal, the second measurement report comprising at least one measurement.

18. The wireless access point of claim 17, wherein the request indicates that the access terminal is eligible for communicating via the second radio access technology.

19. The wireless access point of claim 17, wherein the second frequency band and the third frequency band are one of intra-frequency bands in relation to one another or inter-frequency bands in relation to one another.

20. The wireless access point of claim 17, wherein the first radio access technology comprises long term evolution (LTE) data service, the second radio access technology comprises a circuit-switched voice service and the third radio access technology comprises an intra-frequency data service.

21. The wireless access point of claim 17, wherein the preferred delivery of the third radio access technology is compatible with a preferred delivery of the second radio access technology and the dual radio access capability of the access terminal.

22. The wireless access point of claim 17, further comprising:
means for preparing the first measurement request to include a request to measure a plurality of frequency bands, wherein the plurality of frequency bands include candidates for a preferred delivery of the second radio access technology and the preferred delivery for the third radio access technology; and
wherein the means for selecting is also configured to select the respective preferred deliveries for the second radio access technology and the third radio access technology utilizing the first measurement report provided by the access terminal.

23. The wireless access point of claim 22, wherein the plurality of frequency bands comprises the available frequency bands on which the second radio access technology is provided.

24. The wireless access point of claim 22, wherein the first measurement report comprises measurements for a subset of the plurality of frequency bands for which measurements were requested in the first measurement request.

25. A wireless access terminal comprising:
means for communicating with a first radio access technology on a first frequency band from an access point;
means for transmitting a request for a second radio access technology provided on a second frequency band, wherein participating in the reception of the second radio access technology is not compatible with the capability of the access terminal to receive the first radio access technology, wherein the means for transmitting is also configured to transmit a first measurement report to the access point, wherein the first measurement report comprises at least one measurement;
means for measuring configured to obtain at least one measurement; and
means for receiving a handoff initiation message for initiating a concurrent handover from the first radio access technology to the second radio access technology and a third radio access technology on a third frequency band, from the access point, wherein the means for receiving is further configured to receive a first measurement request from the access point and receive a second measurement request for a preferred delivery of the third radio access technology in response to transmitting the first measurement report, and
wherein the means for measuring is configured to obtain at least one measurement in response to the second measurement request, and
wherein the means for transmitting is configured to transmit a second measurement report to the access point, wherein the second measurement report comprises at least one measurement.

26. The wireless access terminal of claim 25, wherein the request indicates that the access terminal is a proposed participant for the reception of the second radio access technology.

27. The wireless access terminal of claim 25, wherein the second frequency band and the third frequency band are one of intra-frequency bands in relation to one another or inter-frequency bands in relation to one another.

28. The wireless access terminal of claim 25, wherein the first radio access technology comprises long term evolution (LTE) data service, the second radio access technology comprises a circuit-switched voice service and the third radio access technology comprises a high rate packet data service.

29. The wireless access terminal of claim 25, wherein the preferred delivery of the third radio access technology is compatible with a preferred delivery of the second radio access technology and the dual radio access capability of the access terminal.

30. The wireless access terminal of claim 25, wherein the means for obtaining at least one measurement in response to the first measurement request comprises means for obtaining at least one measurement for the second frequency band and at least one measurement for the third frequency band.

31. The wireless access terminal of claim 25 further comprising:
    means for selecting a subset of the frequency bands specified in the first measurement request; and
    wherein the means for measuring is also configured to obtain measurements for the subset of the frequency bands specified in the first measurement request, and wherein the first measurement report comprises measurements for a subset of the plurality of frequency bands for which measurements have been requested in the first measurement request.

32. The wireless access terminal of claim 31, wherein the subset of the frequency bands specified in the first measurement request comprises a single frequency band.

33. A wireless access point comprising:
    a controller configured to execute code; and
    non-transitory computer readable memory storing code that when executed by the controller is configured to:
        receive a request for a second radio access technology on a second frequency band, wherein accessing the second radio access technology causes a change in the capability of an access terminal to receive the first radio access technology;
        prepare a first measurement request associated with providing the second radio access technology utilizing an indicator of a dual radio access capability of the access terminal;
        transmit the first measurement request to the access terminal;
        receive a first measurement report from the access terminal;
        select, utilizing the first measurement report, a third radio access technology on a third frequency band to replace the first radio access technology;
        select a preferred delivery for the third radio access technology utilizing the first measurement report;
        prepare a second measurement request associated with providing the third radio access technology utilizing the first measurement report;
        transmit the second measurement request to the access terminal; and
        receive a second measurement report from the access terminal, wherein the second measurement report comprises at least one measurement; and
        initiate a concurrent handover from the first radio access technology to the second and the third radio access technology.

34. The wireless access point of claim 33, wherein the request indicates that the access terminal is eligible for communicating via the second radio access technology.

35. The wireless access point of claim 33, wherein the second frequency band and the third frequency band are one of intra-frequency bands in relation to one another or inter-frequency bands in relation to one another.

36. The wireless access point of claim 33, wherein the first radio access technology comprises long term evolution (LTE) data service, the second radio access technology comprises a circuit-switched voice service and the third radio access technology comprises an intra-frequency data service.

37. The wireless access point of claim 33, wherein the preferred delivery of the third radio access technology is compatible with a preferred delivery of the second radio access technology and the dual radio access capability of the access terminal.

38. The wireless access point of claim 33, the non-transitory computer readable memory further storing code that when executed by the controller is configured to:
    prepare the first measurement request to include a request to measure a plurality of frequency bands, wherein the plurality of frequency bands include candidates for a preferred delivery of the second radio access technology and the preferred delivery for the third radio access technology; and
    select the respective preferred deliveries for the second radio access technology and the third radio access technology utilizing the first measurement report provided by the access terminal.

39. The wireless access point of claim 38, wherein the plurality of frequency bands comprises the available frequency bands on which the second radio access technology is provided.

40. The wireless access point of claim 38, wherein the first measurement report comprises measurements for a subset of the plurality of frequency bands for which measurements were requested in the first measurement request.

41. A wireless access terminal comprising:
    a controller configured to execute code; and
    non-transitory computer readable memory storing code that when executed by the controller is configured to:
        communicate with a first radio access technology on a first frequency band from an access point;
        transmit a request for a second radio access technology provided on a second frequency band, wherein participating in the reception of the second radio access technology is not compatible with the capability of the access terminal to receive the first radio access technology;
        receive a first measurement request to the access terminal;
        obtain at least one measurement;
        transmit a first measurement report to the access point, wherein the first measurement report comprises at least one measurement; and
        receive a second measurement request for a preferred delivery of a third radio access technology in response to transmitting the first measurement report;
        obtain at least one measurement in response to the second measurement request; and
        transmit a second measurement report to the access point, wherein the second measurement report comprises at least one measurement;

receive a handoff initiation message, to initiate a concurrent handover from the first radio access technology to the second radio access technology and the third radio access technology on a third frequency band, from the access point.

42. The wireless access terminal of claim 41, wherein the request indicates that the access terminal is a proposed participant for the reception of the second radio access technology.

43. The wireless access terminal of claim 41, wherein the request indicates that the access terminal is a proposed participant for the reception of the second radio access technology.

44. The wireless access terminal of claim 41, wherein the first radio access technology comprises long term evolution (LTE) data service, the second radio access technology comprises a circuit-switched voice service and the third radio access technology comprises a high rate packet data service.

45. The wireless access terminal of claim 41, wherein the preferred delivery of the third radio access technology is compatible with a preferred delivery of the second radio access technology and the dual radio access capability of the access terminal.

46. The wireless access terminal of claim 41, the non-transitory computer readable memory further storing code that when executed by the controller is configured to obtain at least one measurement for the second frequency band and at least one measurement for the third frequency band.

47. The wireless access terminal of claim 41, the non-transitory computer readable memory further storing code that when executed by the controller is configured to:
   select a subset of the frequency bands specified in the first measurement request; and
   obtain measurements for the subset of frequency bands specified in the first measurement request, and wherein the first measurement report comprises measurements for a subset of the plurality of frequency bands for which measurements have been requested in the first measurement request.

48. The wireless access terminal of claim 47, wherein the subset of the frequency bands specified in the first measurement request comprises a single frequency band.

49. A system comprising:
a controller configured to execute code; and
non-transitory computer readable memory storing code that when executed by the controller is configured to:
receive a request for a second radio access technology on a second frequency band, wherein accessing the second radio access technology causes a change in the capability of an access terminal to receive the first radio access technology;
receive a first measurement report from the access terminal;
select, utilizing the first measurement report, a third radio access technology on a third frequency band to replace the first radio access technology; and
initiate a concurrent handover from the first radio access technology to the second and third radio access technology,
wherein the second frequency band and the third frequency band are one of intra-frequency bands in relation to one another or inter-frequency bands in relation to one another.

50. A system comprising:
a controller configured to execute code; and
non-transitory computer readable memory storing code that when executed by the controller is configured to:
communicate with a first radio access technology on a first frequency band from an access point;
transmit a request for a second radio access technology provided on a second frequency band, wherein participating in the reception of the second radio access technology is not compatible with the capability of the access terminal to receive the first radio access technology;
obtain at least one measurement;
transmit a first measurement report to the access point, wherein the first measurement report comprises at least one measurement; and
receive a handoff initiation message, to initiate a concurrent handover from the first radio access technology to the second radio access technology and a third radio access technology on a third frequency band, from the access point,
wherein the second frequency band and the third frequency band are one of intra-frequency bands in relation to one another or inter-frequency bands in relation to one another.

* * * * *